United States Patent
Hayasaka

(10) Patent No.: US 9,469,298 B2
(45) Date of Patent: Oct. 18, 2016

(54) DRIVING SUPPORT APPARATUS AND DRIVING SUPPORT METHOD

(71) Applicant: Shoichi Hayasaka, Atsugi (JP)

(72) Inventor: Shoichi Hayasaka, Atsugi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/440,465

(22) PCT Filed: Nov. 13, 2012

(86) PCT No.: PCT/JP2012/079377
§ 371 (c)(1),
(2) Date: May 4, 2015

(87) PCT Pub. No.: WO2014/076758
PCT Pub. Date: May 22, 2014

(65) Prior Publication Data
US 2015/0266473 A1    Sep. 24, 2015

(51) Int. Cl.
*B60W 30/09* (2012.01)
*G08G 1/16* (2006.01)

(52) U.S. Cl.
CPC .............. *B60W 30/09* (2013.01); *G08G 1/166* (2013.01); *B60W 2600/00* (2013.01)

(58) Field of Classification Search
CPC .. G08G 1/161; G08G 1/166; B60T 8/17558; B60T 7/12; B60T 7/22; B60W 30/09; G01S 13/867; G01S 13/931; G60K 9/00805
USPC ............... 701/1, 70, 117, 301, 533; 340/905
See application file for complete search history.

(56) References Cited

U.S. PATENT DOCUMENTS

2004/0181339 A1    9/2004 Mukaiyama

2006/0195231 A1*   8/2006 Diebold ............... B60R 21/013
                                                        701/1
2009/0070026 A1*   3/2009 Kubota .................. G08G 1/161
                                                        701/117

(Continued)

FOREIGN PATENT DOCUMENTS

JP    2002-036908 A    2/2002
JP    2002-307972 A    10/2002

(Continued)

OTHER PUBLICATIONS

International Search Report for PCT/JP2012/079377 dated Nov. 13, 2012 [PCT/ISA/210].

*Primary Examiner* — Behrang Badii
*Assistant Examiner* — Sanjeev Malhotra
(74) *Attorney, Agent, or Firm* — Sughrue Mion, PLLC

(57) ABSTRACT

A driving support apparatus for ensuring consistency of content for multiple driving supports related to vehicle acceleration/deceleration. The driving support apparatus is provided with a follow-up running support unit for performing acceleration/deceleration support for a vehicle. A collision-avoidance support unit avoids a collision with a moving body when the relationship between the vehicle and a moving body having a movement path intersecting with the path of the vehicle is determined to meet support conditions for invoking collision-avoidance support. An estimation unit estimates that the relationship between the vehicle and the moving body meets the support conditions for invoking collision-avoidance support using the acceleration/deceleration support by the follow-up running support unit. An adjustment unit adjusts the degree of acceleration/deceleration support by the follow-up running support unit on the basis of the relationship between the vehicle and the moving body having been estimated to meet the support conditions.

7 Claims, 7 Drawing Sheets

(56) References Cited

U.S. PATENT DOCUMENTS

| | | | |
|---|---|---|---|
| 2009/0112463 A1* | 4/2009 | Yamane | G01C 21/3469 701/533 |
| 2012/0035846 A1* | 2/2012 | Sakamoto | B60T 8/17558 701/301 |
| 2012/0235853 A1 | 9/2012 | Takeuchi | |
| 2014/0303868 A1* | 10/2014 | Otake | B60T 7/12 701/70 |
| 2015/0154865 A1* | 6/2015 | Nakakuki | G08G 1/161 340/905 |

FOREIGN PATENT DOCUMENTS

| | | |
|---|---|---|
| JP | 2004-276732 A | 10/2004 |
| JP | 2005-145187 A | 6/2005 |
| JP | 2005-263058 A | 9/2005 |
| JP | 2007-083818 A | 4/2007 |
| JP | 2009-126358 A | 6/2009 |
| JP | 2009-282702 A | 12/2009 |
| JP | 2010-039603 A | 2/2010 |
| WO | 2011/064824 A1 | 6/2011 |

* cited by examiner

DRIVING SUPPORT APPARATUS AND DRIVING SUPPORT METHOD

CROSS REFERENCE TO RELATED APPLICATIONS

This application is a National Stage of International Application No. PCT/JP2012/079377 filed Nov. 13, 2012, the contents of all of which are incorporated herein by reference in their entirety.

FIELD OF THE DISCLOSURE

The present invention relates to a driving assistance apparatus that assists in driving a vehicle and a driving assistance method.

BACKGROUND OF THE DISCLOSURE

Generally, the driving assistance apparatus that assists in driving a vehicle acquires information of traffic conditions that require deceleration control of the vehicle, such as an intersection, stop sign position, curve, or approaching of a preceding car, by means of an on-vehicle camera or a navigation system. Driving assistance such as deceleration assistance is then provided through an audio braking guidance or a forced application of braking force based on the acquired information of traffic conditions around the vehicle.

The device described in Patent Document 1 has hitherto been known as one example of a driving assistance apparatus. The cruise control apparatus described in Patent Document 1 includes a cruise control means that executes inter-vehicle control when there is a preceding car in which it causes the host vehicle to follow the preceding car, and that executes speed control when there is no preceding car in which it causes the host vehicle to run at a constant speed. The cruise control apparatus also includes a collision determination means that determines an object that has a course intersecting the course of the host vehicle and may possibly collide with the vehicle. When the collision determination means detects an object that may possibly collide with the host vehicle, the degree of acceleration made by the cruise control means is reduced even if the cruise control means is executing the speed control as it detects no preceding car.

Namely, even if the cruise control means fails to recognize a vehicle ahead on the same lane as a preceding car due to an incorrect estimation of its course, the acceleration of the host vehicle is reduced based on the detection of an object with a collision potential by the collision determination means. Accordingly, the possibility of a situation that may give the driver a sense of discomfort, such as the host vehicle approaching the preceding car too closely, is reduced.

PRIOR ART DOCUMENT

Patent Document

Patent Document 1: Japanese Laid-Open Patent Publication No. 2002-36908

SUMMARY OF THE INVENTION

Problems that the Invention is to Solve

While it is expected that the driver's convenience is improved with a plurality of driving assistance apparatuses installed, such as the cruise control means and collision determination means in the cruise control apparatus of Patent Document 1, when there is a plurality of driving assistance apparatuses installed, there is an inherent need to ensure consistency between the assistance of these driving assistance apparatuses. If deceleration assistance is performed immediately after acceleration assistance, for example, the driving assistance itself may give the driver a sense of discomfort.

Accordingly, it is an objective of the present invention to provide a driving assistance apparatus and a driving assistance method that ensure consistency between a plurality of driving assistance contents such as acceleration or deceleration of the vehicle or the like.

Means for Solving the Problems

Means for achieving the above objective and advantages thereof will now be discussed.

To achieve the foregoing objective and in accordance with one aspect of the present invention, a driving assistance apparatus that assists in driving a vehicle is provided. The apparatus includes a first assisting section, a second assisting section, a predicting section, and an adjusting section. The first assisting section performs acceleration/deceleration assistance for the vehicle. When it is determined that a relationship between the vehicle and a moving object that has a movement path intersecting with a course of the vehicle meets an assistance condition for activating collision avoidance assistance, the second assisting section performs the collision avoidance assistance for the vehicle to avoid a collision with the moving object. The predicting section predicts that the relationship between the vehicle and the moving object will meet the assistance condition for activating the collision avoidance assistance through the acceleration/deceleration assistance by the first assisting section. The adjusting section adjusts a degree of the acceleration/deceleration assistance by the first assisting section based on the prediction that the relationship between the vehicle and the moving object will meet the assistance condition.

To achieve the foregoing objective and in accordance with another aspect of the present invention, a driving assistance method for assisting in driving a vehicle is provided. The method includes: a first assisting step of performing acceleration/deceleration assistance for the vehicle; a second assisting step, wherein, when it is determined that a relationship between the vehicle and a moving object that has a movement path intersecting with a course of the vehicle meets an assistance condition for activating collision avoidance assistance, the collision avoidance assistance for the vehicle is performed to avoid a collision with a moving object; a predicting step of predicting that the relationship between the vehicle and the moving object will meet the assistance condition for activating the collision avoidance assistance through the acceleration/deceleration assistance by the first assisting step; and an adjustment step of adjusting a degree of the acceleration/deceleration assistance by the first assisting step based on the prediction that the relationship between the vehicle and the moving object will meet the assistance condition.

With this configuration, it is possible to predict that the assistance condition for activating collision avoidance assistance will be met based on the relationship between the vehicle provided with acceleration/deceleration assistance by the first assisting section and the moving object. Based on this prediction, if it is anticipated (expected) that the collision avoidance assistance of the vehicle will be activated by the acceleration/deceleration assistance for the vehicle, the degree of the acceleration/deceleration assistance is adjusted. Namely, if the possibility arises of the collision avoidance assistance being performed, the degree of acceleration/deceleration assistance can be adjusted. In other words, adjustments are made to achieve consistency between the acceleration/deceleration assistance and collision avoidance assistance, including whether the acceleration/deceleration assistance meets an assistance condition for activating the collision avoidance assistance.

This ensures consistency in the driving assistance, i.e., between the acceleration/deceleration assistance and the collision avoidance assistance, so that the sense of discomfort the assistance may give to the driver is mitigated.

The predicting section preferably predicts that the relationship between the vehicle and the moving object will meet the assistance condition for activating the collision avoidance assistance based on an amount of assistance provided by the first assisting section at the time of the prediction.

With this configuration, it is possible to predict that the collision avoidance assistance condition will be met by the relationship between the vehicle and a moving object based on the amount of assistance provided by the first assisting section at the time of the prediction.

This way, whether driving assistance by the first assisting section meets the collision avoidance assistance condition is predicted quickly and easily.

The assistance by the first assisting section is preferably acceleration assistance. The adjusting section preferably makes an adjustment to restrict the acceleration assistance by the first assisting section when the predicting section predicts that the relationship between the vehicle and the moving object will meet the assistance condition for activating the collision avoidance assistance.

With this configuration, activation of the collision avoidance assistance by the acceleration assistance is restricted. If the collision avoidance assistance is activated, the assistance contents will be switched over from the acceleration assistance, so that there is a possibility that the driving may feel a sense of discomfort.

With the configuration described above, however, the degree of acceleration assistance is reduced if it is predicted that the collision avoidance assistance will be activated, so that frequent changes in the assistance contents because of the acceleration assistance and collision avoidance assistance being both activated are prevented, and the possibility that the driving may feel a sense of discomfort is reduced.

The assistance by the first assisting section is preferably deceleration assistance. The adjusting section preferably makes an adjustment to increase an amount of the deceleration assistance by the first assisting section when the predicting section predicts that the relationship between the vehicle and the moving object will meet the assistance condition for activating the collision avoidance assistance.

With this configuration, even when the collision avoidance assistance is activated by deceleration assistance, after the activation of the collision avoidance assistance, the situation where the assistance condition for the collision avoidance assistance is met is quickly evaded.

Therefore, even if collision avoidance assistance is activated as the result of assistance by the first assisting section, such collision avoidance assistance can be quickly canceled. Moreover, since the amount of deceleration assistance increased by the adjusting section reflects the assistance content of the first assisting section, the driver's sense of discomfort is mitigated.

When acceleration assistance by the first assisting section and the collision avoidance assistance by the second assisting section are provided simultaneously, the adjusting section preferably makes an adjustment to give priority to the collision avoidance assistance over the acceleration assistance.

With this configuration, as priority is given to the collision avoidance assistance, a collision between the vehicle and the moving object is avoided. By giving priority to the collision avoidance assistance, at least the degree of acceleration is reduced in advance, so that a sudden change from the acceleration assistance to the deceleration assistance is prevented, and the driver's sense of discomfort is mitigated.

When deceleration assistance by the first assisting section and the collision avoidance assistance by the second assisting section are provided simultaneously, the adjusting section preferably makes an adjustment simultaneously to change a deceleration amount to a value larger than or equal to the larger one of deceleration amounts of the deceleration assistance and the collision avoidance assistance.

With this configuration, the deceleration assistance is performed with the same amount of deceleration as by the collision avoidance assistance or with a larger amount, so that a collision between the vehicle and the moving object is avoided. Moreover, the amount of deceleration after being adjusted by the adjusting section is consistent with the assistance content of the first assisting section.

The second assisting section preferably determines a first time taken by the vehicle to reach an meeting point where the vehicle meets the moving object cross, and a second time taken by the moving object to reach the meeting point, and determines whether the assistance condition for activating the collision avoidance assistance is met based on presence or absence of entry into a determination basis area defined by a relationship between the determined first time and second time. The predicting section preferably predicts that the assistance condition will be met based on the relationship between the first time and the second time in relation to the determined determination basis area.

With this configuration, the second assisting section assists driving in the form of the collision avoidance assistance based on the first time or TTC (Time to Collision), which is the time taken by the vehicle to reach an meeting point where the vehicle and the moving object meet, and the second time or TTV (Time to Vehicle), which is the time taken by the moving object to reach the meeting point. In this case, the predicting section predicts an entry into the determination basis area based on the first time and the second time.

The determination basis area, which is determined based on the relationship between the first time and the second time, is preferably pre-registered as map data.

With this configuration, activation of the collision avoidance assistance, and prediction of the activation of the collision avoidance assistance are determined based on the map data and the relationship between the first time and the second time.

DETAILED DESCRIPTION OF THE PREFERRED EMBODIMENTS

First Embodiment

A driving assistance apparatus and a driving assistance method according to a first embodiment will now be described with reference to FIGS. 1 to 8.

Figure 1:
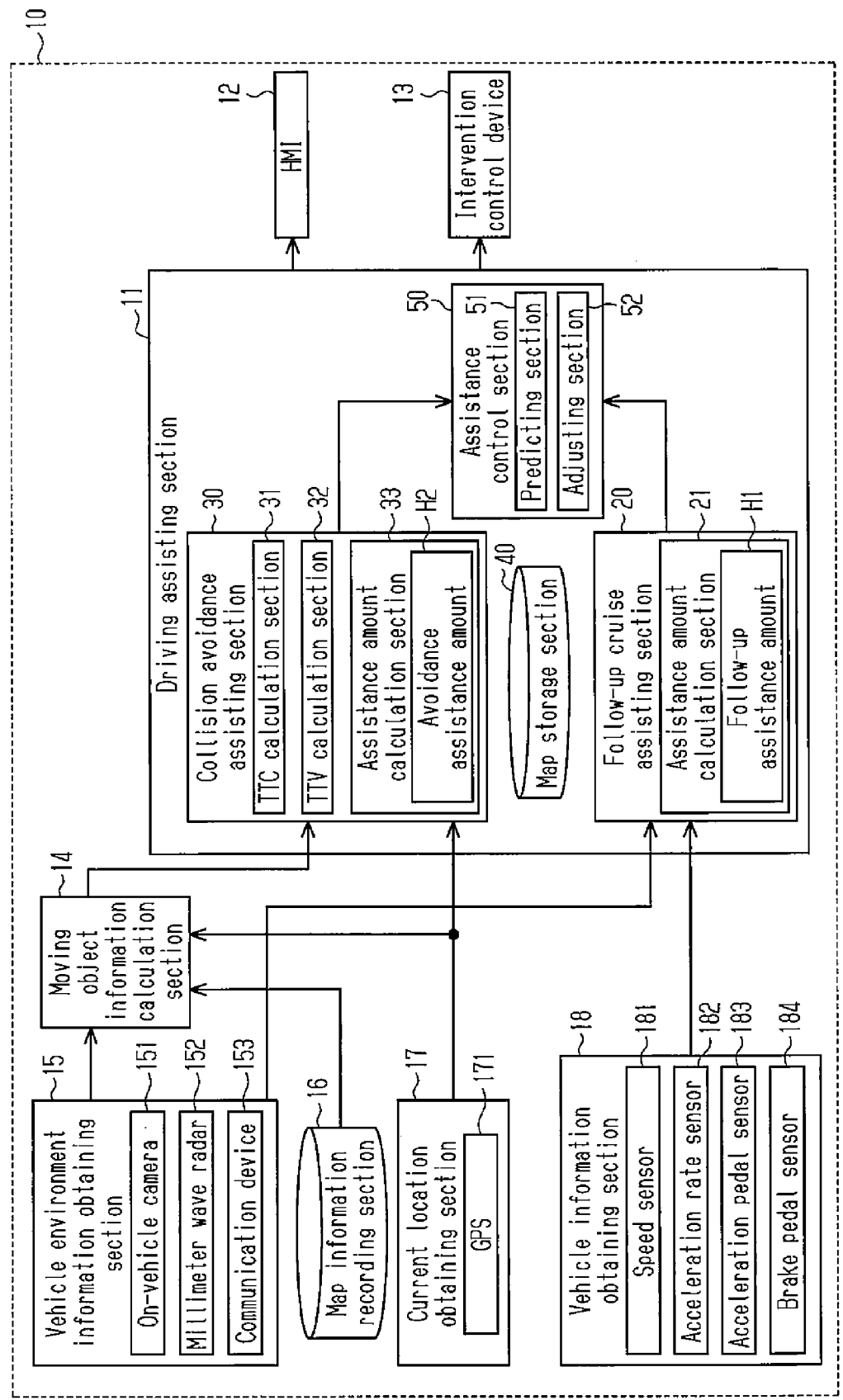
FIG. 1 is a block diagram illustrating the general configuration of a driving assistance apparatus according to a first embodiment of the present invention.

As shown in FIG. 1, a vehicle 10, to which the driving assistance apparatus and driving assistance method are applied, includes a driving assisting section 11 that provides a variety of driving assistance to the vehicle 10. The vehicle 10 also includes an HMI (human machine interface) 12 for notifying the driver of assistance, an intervention control device 13 that aids the operation of the vehicle, and a moving object information calculation section 14 that detects a moving object to be avoided in collision avoidance assistance. The driving assisting section 11 is connected to the HMI 12 and intervention control device 13 such that it can output information, and to the moving object information calculation section 14 such that it can acquire information.

The vehicle 10 includes a vehicle environment information obtaining section 15 that acquires information on the surrounding environment of the vehicle 10, a map information recording section 16 containing road maps, a current location obtaining section 17 that acquires a current location of the vehicle 10, and a vehicle information obtaining section 18 that acquires various information of the vehicle 10 as vehicle information. The vehicle environment information obtaining section 15 and map information recording section 16 are connected to the moving object information calculation section 14 such that they can output information. The vehicle environment information obtaining section 15, current location obtaining section 17, and vehicle information obtaining section 18 are connected to the driving assisting section 11 such that they can output information.

The vehicle environment information obtaining section 15 includes an on-vehicle camera 151 mounted to the vehicle 10 for taking pictures of the surrounding environment of the vehicle 10, a millimeter wave radar 152 for sensing an object present around the vehicle 10, and a communication device 153 that has a function of wireless communication with an external device or the like.

The on-vehicle camera 151 is a CCD camera, for example, installed on the backside of a room mirror for taking pictures of a predetermined range in front of the vehicle 10. The on-vehicle camera 151 outputs image signals based on the taken pictures to the moving object information calculation section 14.

The millimeter wave radar 152 has, for example, a function of measuring the distance between an object present around the host vehicle 10 and the host vehicle 10, and a function of measuring relative speed between the object and the host vehicle 10. When the millimeter wave radar 152 detects an object present around the host vehicle 10, it outputs signals containing information of the detected object to the moving object information calculation section 14.

The communication device 153 acquires information indicative of the speed and location of other vehicles through inter-vehicle communication with other vehicles present around the host vehicle 10. The communication device 153 outputs acquired information to the moving object information calculation section 14. The communication device 153 also performs road-to-vehicle communication with an optical beacon antenna provided as road infrastructure. The communication device 153 acquires infrastructure information signals regarding road infrastructure or the like through the road-to-vehicle communication with optical beacon antennas. When the communication device 153 acquires infrastructure information signals, it outputs the received infrastructure information signals to the moving object information calculation section 14 or the driving assisting section 11. The infrastructure information signals include, for example, the distance to an intersection, a signal cycle time of a traffic light provided at the intersection, road alignments, as well as conditions of the road where the optical beacon antenna is provided (including the shape of the intersection, curvature, inclination, number of lanes). The infrastructure information signals also include accompanying information about the road, and information on moving objects such as other vehicles around the intersection detected by ground installations or the like.

The map information recording section 16 holds map information containing road maps, and allows the moving object information calculation section 14 to read out the map information held therein. The moving object information calculation section 14 specifies a location to read out map information corresponding to this location from the map information recording section 16. The map information includes information indicative of latitudes and longitudes of curves, intersections, one-way roads, stop sign positions, railroad crossings, and traffic lights.

The current location obtaining section 17 includes a GPS 171 used for detection of the current location of the vehicle 10. The GPS 171 receives a signal from a GPS satellite and detects the current location of the host vehicle 10 based on the signal received from the GPS satellite. The GPS 171 outputs the information indicative of the detected location to the driving assisting section 11 or the moving object information calculation section 14.

The vehicle information obtaining section 18 includes a speed sensor 181, an acceleration rate sensor 182, an acceleration pedal sensor 183, and a brake pedal sensor 184.

The speed sensor 181 detects the rotation speed of the wheels of the host vehicle 10 and outputs a signal in accordance with the detected rotation speed to the driving assisting section 11.

The acceleration rate sensor 182 detects the acceleration rate of the host vehicle 10 and outputs a signal in accordance with the detected acceleration rate to the driving assisting section 11.

The acceleration pedal sensor 183 detects presence or absence of an operation by the driving to the acceleration pedal, and the amount of depression of the pedal, and outputs signals in accordance with the detected presence or absence of an operation or depression amount of the pedal to the driving assisting section 11.

The brake pedal sensor 184 detects presence or absence of an operation by the drive to the brake pedal, and the amount of depression of the pedal, and outputs signals in accordance with the detected presence or absence of an operation or depression amount of the pedal to the driving assisting section 11.

The HMI 12 is a device that outputs an image or sound that the driving can perceive. The image can contain at least one of still images and moving images. The sound can contain at least one of a simple sound such as an alarm sound and voice guidance. The HMI 12 is configured with, for example, an audio device, a head-up display, a navigation system with a monitor, an instrument panel, and the like. The HMI 12 may be configured with only a screen, or only a speaker, or only a buzzer. When a warning instruction signal is input from the driving assisting section 11, the HMI 12 outputs the content corresponding to the input signal in a manner perceivable to the driving. The HMI 12 performs deceleration control or acceleration control by outputting information perceptible to the driving based on warning information signals input from an assistance control section 50.

Deceleration control may include, for example, warning the driver of the presence of a person or vehicle ahead in the forward direction, and displaying a warning message on the head-up display or the like.

Acceleration control may include an indication of the inter-vehicle distance being increased.

The intervention control device 13 is a device that supplements (assists) one or more of braking, acceleration, steering and the like of the vehicle 10, and supplements braking, acceleration, steering and the like based on intervening control signals input from the driving assisting section 11. The intervention control device 13 is configured with, for example, various control devices and the like of the vehicle 10 such as a brake control device for controlling the brake actuator, an engine control device for controlling the engine, and a steering control device for controlling the steering actuator. The intervention control device 13 performs deceleration control or acceleration control based on the intervening control signals input from the driving assisting section 11.

Deceleration control may include, for example, reducing the engine rpm, stopping fuel supply to the engine (fuel cut-off operation), brake assistance control, and pre-braking control. The speed of the vehicle 10 can be decreased by controlling the brake control device or the like, for example. A certain inter-vehicle distance is kept, or a preset speed is maintained, by such deceleration control.

Acceleration control may include constant speed control for keeping a preset speed, or follow-up control in which the speed is increased in accordance with a speed increase of the preceding car that the vehicle is following. A certain inter-vehicle distance is maintained, or a preset speed is maintained, by such acceleration control.

The moving object information calculation section 14 detects moving objects 60 such as pedestrians or other vehicles that are the object to be avoided in collision avoidance assistance. The moving object information calculation section 14 detects moving objects 60 (shown in FIG. 2) present around the vehicle 10 based on the information around the vehicle 10 input from the vehicle environment information obtaining section 15, the current location information input from the current location obtaining section 17, and the map information acquired from the map information recording section 16. The section then specifies a moving object 60 to be avoided in the collision avoidance assistance from the detected moving objects 60, and outputs moving information of the specified moving object 60 (such as speed and moving direction) to the driving assisting section 11.

The driving assisting section 11 will now be described.

The driving assisting section 11 provides two types of driving assistance as a plurality of types of driving assistance, which are collision avoidance assistance and follow-up cruise assistance, and adjusts the degree of these two types of driving assistance. The driving assisting section 11 includes a follow-up cruise assisting section 20 as a first assisting section for performing follow-up cruise assistance, a collision avoidance assisting section 30 as a second assisting section for performing collision avoidance assistance, a map storage section 40 for storing a map used in the collision avoidance assistance, and an assistance control section 50 that adjusts the degree of the two types of driving assistance.

The driving assisting section 11 is configured to include a microcomputer that has a processor (CPU), and nonvolatile or volatile storage devices such as ROM or RAM. The non-volatile storage device of the driving assisting section 11 contains a control program that performs various processing operations and various parameters used in the various processing operations. The processor executes the control program contained in the storage device as required, and looks up the various parameters as required during the execution of the control program. In this embodiment, the control program includes a program for performing the collision avoidance assistance, a program for performing the follow-up cruise assistance, and a program for adjusting the degree of two types of driving assistance. These programs may be contained in the driving assisting section 11 as separate programs and executed individually. Various parameters include parameters used in the collision avoidance assistance, follow-up cruise assistance, and adjustment of the degree of two types of driving assistance.

Namely, the driving assisting section 11 exerts the functions of the follow-up cruise assisting section 20, collision avoidance assisting section 30, and assistance control section 50, by executing the control program.

The follow-up cruise assisting section 20 provides driving assistance for allowing the host vehicle 10 to follow a car immediately ahead of the host vehicle 10. The follow-up cruise assisting section 20 includes an assistance amount calculation section 21 for calculating a follow-up assistance amount H1 that is the assistance amount required for the driving assistance, and outputs the follow-up assistance amount H1 calculated at the assistance amount calculation section 21 to the assistance control section 50.

The follow-up cruise assisting section 20 assists an acceleration or deceleration (speed increasing/decreasing) operation of the host vehicle 10 (first assisting step) for allowing the host vehicle 10 to follow the preceding car. The follow-up cruise assisting section 20 performs speed control to assistance the speed increasing/decreasing operation of the host vehicle 10 so that the vehicle runs at a preset speed such as a legal speed when there is no car ahead to follow. If, on the other hand, there is a car ahead to follow, the follow-up cruise assisting section 20 performs inter-vehicle control to assistance the speed increasing/decreasing operation of the vehicle 10 so that the distance from the preceding car is maintained appropriately within the range not exceeding a preset value.

That is, if the speed of the vehicle 10 is going to exceed the preset value, or if the distance from the preceding car is going to be shorter than appropriate, the follow-up cruise assisting section 20 performs deceleration assistance, which is driving assistance for reducing the speed of the vehicle 10. On the other hand, if the speed of the vehicle 10 is lower than the preset value, if there is no car ahead, or if the distance from the preceding car is longer than appropriate, the follow-up cruise assisting section 20 performs acceleration assistance, which is driving assistance for increasing the speed of the vehicle 10 to the preset value.

The follow-up assistance amount H1 is set either to a first follow-up deceleration amount or a second follow-up deceleration amount in the deceleration assistance, and set either to a first follow-up acceleration amount or a second follow-up acceleration amount in the acceleration assistance. If there is no need of assistance, it is set to 0. The first follow-up deceleration amount is smaller than the second follow-up deceleration amount, and the first follow-up acceleration amount is smaller than the second follow-up acceleration amount. The assistance amount calculation section 21 may indicate the follow-up assistance amount H1 by numerical values. In that case, the assistance amount of the acceleration assistance may be indicated by positive values, while the assistance amount of the deceleration assistance may be indicated by negative values.

The follow-up cruise assisting section 20 outputs a signal indicative of the calculated follow-up assistance amount H1 to the assistance control section 50.

Figure 2:
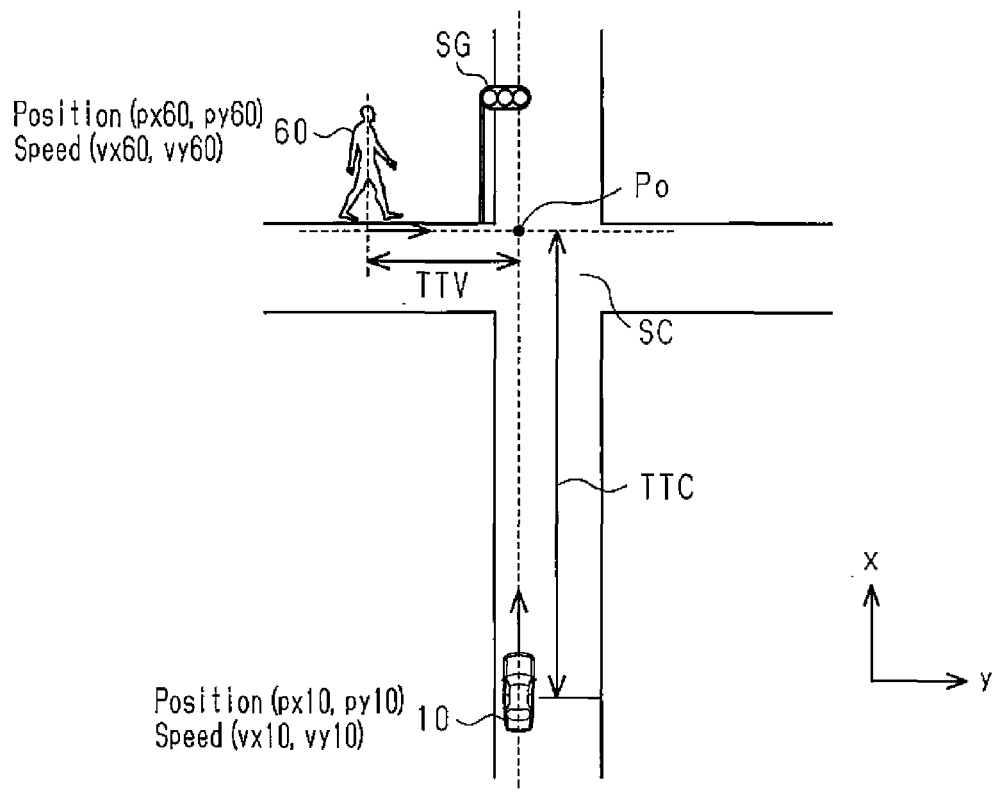
FIG. 2 is a diagram schematically illustrating collision avoidance assistance by the driving assistance apparatus shown in FIG. 1.

As shown in FIG. 2, the collision avoidance assisting section 30 provides collision avoidance assistance, which is driving assistance for allowing the host vehicle 10 to avoid a collision with a moving object 60 (second assisting step), in accordance with the possibility of the vehicle 10 and the moving object 60 colliding at an meeting point Po of an intersection SC. The meeting point Po may be a location other than the intersection SC, as long as it is a point where the courses of the vehicle 10 and the moving object 60 cross each other.

As shown in FIG. 1, the collision avoidance assisting section 30 receives an input of current location information of the host vehicle 10 from the current location obtaining section 17, and an input of information of a moving object 60 to be avoided from the moving object information calculation section 14. The collision avoidance assisting section 30 includes a TTC calculation section 31 for calculating a first time duration TTC (Time To Collision), which is a time duration required for the host vehicle 10 to reach the meeting point where the courses of the vehicle and the moving object 60 cross each other. The collision avoidance assisting section 30 also includes a TTV calculation section 32 for calculating a second time duration TTV (Time To Vehicle), which is a time duration required for the moving object 60 to reach the meeting point where the courses of the host vehicle 10 and the moving object cross each other. The collision avoidance assisting section 30 includes an assistance amount calculation section 33 for calculating an avoidance assistance amount H2 that is the assistance amount required for the driving assistance based on the first time duration TTC and the second time duration TTV, and outputs an avoidance assistance amount H2 calculated at the assistance amount calculation section 33 to the assistance control section 50.

As shown in FIG. 2, the collision avoidance assisting section 30 can calculate the current location (px10, py10) or the speed (vx10, vy10) of the host vehicle 10 based on the current location information of the host vehicle 10 and the vehicle information of the host vehicle 10. The collision avoidance assisting section 30 can also calculate the current location (px60, py60) or the speed (vx60, vy60) of the moving object 60 based on the moving object information of the moving object 60 and the current location information of the host vehicle 10. The relative positional relationship between the current location of the host vehicle 10 and the current location of the moving object 60 is indicated by a relative position (x, y).

The meeting point Po (collision point) may be determined from the current location of the host vehicle 10 (px10, py10), the vector of the host vehicle 10 represented by the speed (vx10, vy10), the current location of the moving object 60 (px60, py60), and the vector of the moving object 60 represented by the speed (vx60, vy60). Alternatively, the meeting point Po (collision point) may be determined in consideration of map information, traffic information, paths in the past, and so on. If, for example, the meeting point can be identified as an intersection from the map information, exact distances from the host vehicle 10 and moving object 60 to this intersection can be obtained.

In this embodiment, for convenience of explanation, the advancing direction of the moving object 60 is determined on the basis of the advancing direction of the host vehicle 10. Namely, the speed is indicated as (vx10, 0), supposing that the host vehicle 10 moves only in the advancing direction. The speed of the moving object 60 is indicated as (xv60, vy60), supposing that it moves in the advancing direction and the direction orthogonal to the advancing direction. The relative positional relationship between the host vehicle 10 and the moving object 60 is indicated by a current relative position (x, y).

The collision avoidance assisting section 30 predicts the time duration (TTC, TTV) required for the host vehicle 10 and the moving object 60 to reach the meeting point Po where the courses of the host vehicle 10 and the moving object 60 cross each other, and determines the possibility of collision based on this predicted time duration.

First, the collision avoidance assisting section 30 calculates the first time TTC that is the time required for the host vehicle 10 to reach the meeting point where the courses of the vehicle and the moving object 60 cross each other. The first time TTC in this embodiment is a time taken by the host vehicle 10 to collide against the moving object 60 (reaches the meeting point) provided that the vehicle 10 maintains the current course and the driving speed. As shown by the following expression (1), the first time TTC can be determined by dividing the relative distance between the host vehicle 10 and moving object 60 on the basis of the advancing direction of the host vehicle 10, i.e., the relative position (x), by the relative speed (|vx10−vx60|) between the host vehicle 10 and moving object 60.

The collision avoidance assisting section 30 also calculates the second time TTV that is the time required for the moving object 60 to reach the meeting point Po. The second time TTV in this embodiment is a time taken by the moving object 60 to collide against the host vehicle 10 provided that the moving object 60 maintains the current course and the driving speed. As shown by the following expression (2), the second time TTV can be determined by dividing the relative distance between the host vehicle 10 and moving object 60 on the basis of the direction orthogonal to the advancing direction of the host vehicle 10, i.e., the relative position (y), by the relative speed (|0−vy60|) between the host vehicle 10 and moving object 60. Since the host vehicle 10 does not move in the direction orthogonal to the advancing direction, the speed can be considered to be zero.

$$TTC=x/(vx10-vx60) \quad (1)$$

$$TTV=y/vy60 \quad (2)$$

Figure 3:
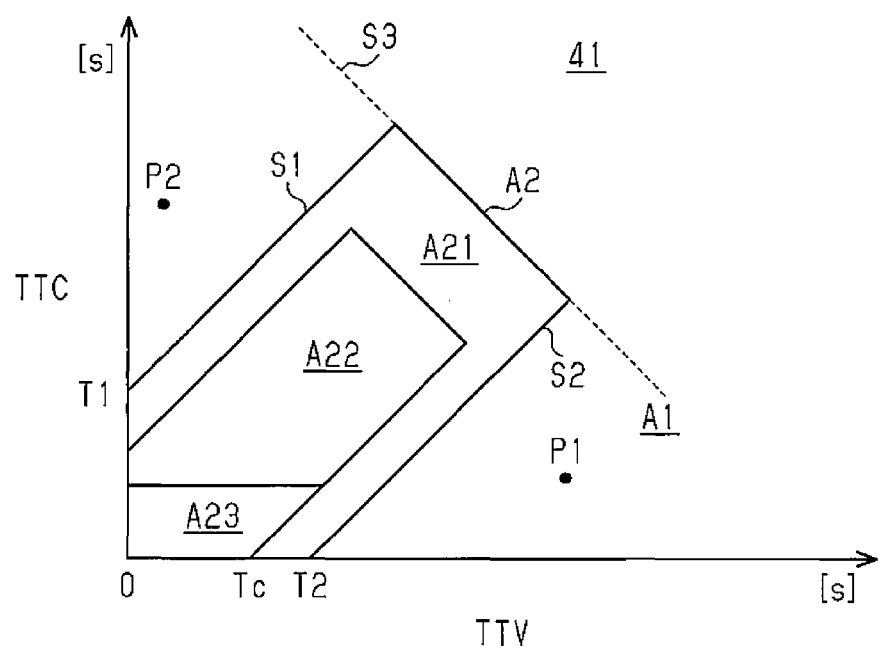
FIG. 3 is a map used in the collision avoidance assistance by the driving assistance apparatus shown in FIG. 1.

As shown in FIG. 3, the map storage section 40 stores a map 41 as map data that is used for determination of whether or not to activate the collision avoidance assistance. The map 41 defines the time [s] for the first time TTC in y axis and time [s] for the second time TTV in x axis. The map 41 also defines a determination basis area (driving assistance area A2) based on the relationship between the first time TTC and the second time TTV. The determination basis area (driving assistance area A2) is used in the determination of whether conditions are met to activate the collision avoidance assistance.

The driving assistance area A2 is an area where the collision avoidance assistance is activated for avoiding a collision between the vehicle 10 that is the assistance target and a moving object 60 such as a pedestrian or other vehicles. The map 41 also includes a driving assistance unnecessary area A1, which is an area formed by other parts than the driving assistance area A2 where the collision avoidance assistance is not activated. The driving assistance area A2 is set in a region where the difference between the first time TTC and the second time TTV is small and which is close to the origin 0. The driving assistance area A2 is an area defined based on experimental data or the like, for example. The driving assistance area A2 can be set also based on the results of learning of driving operation characteristics of the driver, such as acceleration or brake pedal operation characteristics.

Whether or not to activate the collision avoidance assistance is determined based on the position of the intersection between the first time TTC and the second time TTV on the map 41. The origin 0 on the map 41 corresponds to the meeting point Po between the vehicle 10 and the pedestrian in FIG. 2. In the map 41, as the first time TTC or second time TTV increase, the intersection between the first time TTC and the second time TTV moves away from the origin 0. The farther the intersection between the first time TTC and the second time TTV moves away from the origin 0, the farther the vehicle 10 and pedestrian are located from the meeting point, at the time point when the first time TTC and the second time TTV are calculated. The larger the difference between the first time TTC and the second time TTV, the larger becomes the difference in the time at which the vehicle 10 and pedestrian approach the origin 0. In other words, the distance between the vehicle 10 and pedestrian increases.

In this embodiment, when the intersection between the first time TTC and the second time TTV is positioned within the driving assistance area A2 on the map 41, the condition for activating the collision avoidance assistance is met. In contrast, when the intersection between the first time TTC and the second time TTV is positioned within the driving assistance unnecessary area A1 on the map 41, the condition for activating the collision avoidance assistance is not met. The driving assistance area A2 is a region defined by a function fx expressed as y=fx (TTC, TTV).

In portions where the driving assistance area A2 adjoins the driving assistance unnecessary area A1 are two boundary lines S1 and S2 that are upward sloping lines in the two drawings. The two boundary lines S1 and S2 are set on both sides of an intermediate line defined on the map 41 where first time TTC=second time TTV. The intermediate line is a line drawn between the x axis and y axis at an angle of 45 degrees on the map 41 when the x axis and y axis representing the first time TTC and the second time TTV are scaled the same on the map 41. The boundary line S1 is set in the region where the first time TTC>the second time TTV, while the boundary line S2 is set in the region where the first time TTC<the second time TTV.

The two boundary lines S1 and S2 are each set so that the difference between the first time TTC and the second time TTV, i.e., the first time TTC—the second time TTV, will be a predetermined value. In this embodiment, the boundary line S1 is set such that a value T1, which is the first time TTC—the second time TTV, will be 1 to 3 seconds. Namely, if the second time TTV is 0, the first time TTC is 1 to 3 seconds. The boundary line S2 is set such that value T2, which is the second time TTV—the first time TTC, will be 1 to 3 seconds. Namely, if the first time TTC is 0, the second time TTV is 1 to 3 seconds.

As shown in FIG. 3, the driving assistance area A2 is divided into a first area A21, a second area A22, and a third area A23 in accordance with the degree of emergency of the driving assistance. In this embodiment, the first area A21 is an area with low emergency, where a warning is issued to the driver as collision avoidance assistance. The second area A22 is an area with high emergency, where the driver's driving operation is intervened in a supplementary manner as collision avoidance assistance. The third area A23 is an area with extremely high emergency, where the driver's driving operation is intervened as collision avoidance assistance.

The first area A21 is part of the driving assistance area A2 that adjoins the driving assistance unnecessary area A1, where the difference between the first time TTC and the second time TTV is large. In the first area A21, driving assistance is provided wherein the driver is warned of the presence of a moving object 60, or an abnormal approach of the vehicle 10 to the moving object 60. Namely, the driving assistance assigned to the first area A21 is performed when the intersection between the first time TTC and the second time TTV is positioned within the first area A21 on the map 41.

The second area A22 is an inner part of the first area A21 where the difference between the first time TTC and the second time TTV is smaller than that in the first area A21. In the second area A22, a warning is issued to the driver, as well as intervening control such as supplementary braking is performed as driving assistance.

The third area A23 is an area located closest to the origin 0 in the driving assistance area A2 and within a predetermined range from the origin 0. Namely, the third area A23 is defined as an area where the vehicle 10 and moving object 60 are located closest to the meeting point. In the third area A23, a warning is issued to avoid a collision between the moving object 60 and the vehicle 10, as well as emergent intervening control such as sudden braking is performed as driving assistance.

On the other hand, the driving assistance unnecessary area A1 is the part other than the driving assistance area A2. For example, in FIG. 3, point P1 located within the driving assistance unnecessary area A1 is the point where the first time TTC<<the second time TTV. When the first time TTC<<the second time TTV is established, it means that the moving object 60 will reach the meeting point after more than a certain time has passed after the vehicle 10 has passed the meeting point. For example, point P2 located within the driving assistance unnecessary area A1 is the point where the first time TTC>>the second time TTV. When the first time TTC>>the second time TTV is established, it means that the vehicle 10 will reach the meeting point after more than a certain time has passed after the moving object 60 has passed the meeting point. In this way, in the driving assistance unnecessary area A1, the respective times required for the vehicle 10 and moving object 60 to reach the meeting point are different by more than a certain amount. In other words, there is more than a certain distance kept between the vehicle 10 and moving object 60. Therefore, no driving assistance that is performed as collision avoidance assistance is necessary in the driving assistance unnecessary area A1.

As shown in FIG. 1, the collision avoidance assisting section 30 determines whether or not to activate collision avoidance assistance. The collision avoidance assisting section 30 determines whether an activation condition is met, based on the first time TTC, the second time TTV, and the map 41. When the intersection between the first time TTC and the second time TTV is positioned within the driving assistance area A2 on the map 41, the collision avoidance assisting section 30 determines that the condition for activating the collision avoidance assistance is met. The collision avoidance assisting section 30 also calculates an avoidance assistance amount H2 for each area, based on the types of areas where the intersection between the first time TTC and the second time TTV is present, i.e., whether it is the first area A21, the second area A22, or the third area A23.

In this embodiment, the avoidance assistance amount H2 is set for each area. The avoidance assistance amount H2 is set to 0 for the driving assistance unnecessary area A1, a first deceleration amount for avoidance for the first area A21, a second deceleration amount for avoidance for the second area A22, and a third deceleration amount for avoidance for the third area A23. The relationship between these deceleration amounts is the first deceleration amount for avoidance<the second deceleration amount for avoidance<the third deceleration amount for avoidance. The avoidance assistance amount H2 may be indicated as numerical values. Deceleration may be indicated by negative numerical values.

The collision avoidance assisting section 30 outputs a signal indicative of the calculated avoidance assistance amount H2 to the assistance control section 50.

The assistance control section 50 selects appropriate driving assistance based on the follow-up assistance amount H1 input from the follow-up cruise assisting section 20 and the avoidance assistance amount H2 input from the collision avoidance assisting section 30, and outputs a signal corresponding to the selected driving assistance to the HMI 12 and intervention control device 13. Namely, the assistance control section 50 generates a warning instruction signal for issuing a warning from the HMI 12 based on the selected driving assistance, and outputs the generated warning instruction signal to the HMI 12. The assistance control section 50 also generates an intervening control signal for executing intervention control by the intervention control device 13 based on the selected driving assistance, and outputs the generated intervening control signal to the intervention control device 13.

In this embodiment, the assistance control section 50 generates and outputs warning instruction signals and intervening control signals that are adjusted appropriately so as not to give the driver a sense of discomfort when driving assistance is provided based on the follow-up assistance amount H1 or avoidance assistance amount H2.

First, the basic operation of the assistance control section 50 will be described.

The assistance control section 50 generates warning instruction signals and intervening control signals for acceleration assistance when a signal representing a first follow-up acceleration amount or a second follow-up acceleration amount is input as the follow-up assistance amount H1. In this embodiment, when a first follow-up acceleration amount is input, an intervening control signal is generated, while, when a second follow-up acceleration amount is input, both an intervening control signal and a warning instruction signal are generated. The warning instruction signal includes an instruction directed to the driver to increase speed, while the intervening control signal includes an acceleration command. This way, the intervention control device 13 performs intervening control to increase the speed of the vehicle 10, so that the vehicle 10 accelerates and the inter-vehicle distance is maintained. Also, an acceleration operation by the driver who has perceived the warning regarding the acceleration assistance by the HMI 12 helps maintain the inter-vehicle distance.

The assistance control section 50 generates warning instruction signals and intervening control signals for deceleration assistance when a signal representing a first follow-up deceleration amount or second follow-up deceleration amount is input as the follow-up assistance amount H1. In this embodiment, when a first follow-up deceleration amount is input, an intervening control signal is generated, while, when a second follow-up deceleration amount is input, a warning instruction signal is generated. The warning instruction signal includes an instruction directed to the driver to reduce speed, while the intervening control signal includes a deceleration command. Thus, the driver who has perceived the warning regarding the deceleration assistance through the HMI 12 performs a speed reducing operation, so that the inter-vehicle distance is maintained. Alternatively, the intervention control device 13 performs intervening control to decrease the speed of the vehicle 10, so that the vehicle 10 slows down and the inter-vehicle distance is maintained.

The assistance control section 50 generates warning instruction signals and intervening control signals for deceleration assistance when a signal representing a first deceleration amount for avoidance, a second deceleration amount for avoidance, or a third deceleration amount for avoidance is input as the avoidance assistance amount H2. In this embodiment, when a first deceleration amount for avoidance is input, only a warning instruction signal is generated. When a second deceleration amount for avoidance or a third deceleration amount for avoidance is input, both a warning instruction signal and an intervening control signal are generated. Since the relationship between these deceleration amounts is the second deceleration amount for avoidance<the third deceleration amount for avoidance, the deceleration instruction included in the warning instruction signal or the deceleration command included in the intervening control signal corresponding to the third deceleration amount for avoidance are more intensive, or larger, than the instruction or command corresponding to the second deceleration amount for avoidance. Namely, the intervening control signal corresponding to the third deceleration amount for avoidance is an emergent intervening control signal that instructs an emergent intervention to the driving by the intervention control device 13.

The warning instruction signal includes an instruction directed to the driver to reduce speed, as well as, for example, the position of a moving object 60 expected to collide with the vehicle 10, distance to the moving object 60, and expected time until the collision, and so on. Thereby, the driver who has perceived the warning by the HMI 12 reduces the speed, or changes the course, so that the intersection between the first time TTC and the second time TTV changes, as a result of which the moving object 60 passes the meeting point Po before the vehicle 10 reaches the meeting point.

The intervening control signal includes a deceleration command, which indicates, for example, a control amount such as the amount of braking that can shift the intersection between the first time TTC and the second time TTV located within the driving assistance area A2 to outside of the driving assistance area A2. Thereby, as the vehicle 10 slows down by the intervening control by the intervention control device 13, the position of the intersection between the first time TTC and the second time TTV changes, as a result of which the moving object 60 passes the meeting point before the vehicle 10 reaches the meeting point. Namely, a collision between the vehicle 10 and the moving object 60 is avoided, or an abnormal approach to each other is prevented.

The emergent intervening control signal includes a deceleration command, which indicates, for example, a control amount such as a large amount of braking that can shift the intersection between the first time TTC and the second time TTV located within the driving assistance area A2, particularly at a position with a high collision potential, to outside of the driving assistance area A2. Thereby, as the vehicle 10 slows down rapidly by the intervening control by the intervention control device 13, the position of the intersection between the first time TTC and the second time TTV changes, as a result of which the moving object 60 passes the meeting point before the vehicle 10 reaches the meeting point. Namely, a collision between the vehicle 10 and the moving object 60, or an abnormal approach to each other are avoided.

When the follow-up cruise assistance and collision avoidance assistance are both under way, if the driving assistance is provided without any adjustments between these assistance contents, acceleration assistance may be switched to deceleration assistance in a short time, for example, which may give the driver a sense of discomfort. The assistance control section 50 therefore adjusts the follow-up assistance amount H1 and avoidance assistance amount H2 appropriately before sending them to the HMI 12 and intervention control device 13 when the follow-up cruise assistance and collision avoidance assistance are both under way.

The necessity of adjustment of the follow-up assistance amount H1 and avoidance assistance amount H2 by the assistance control section 50 will be described with reference to FIGS. 4 and 5.

Figure 4:
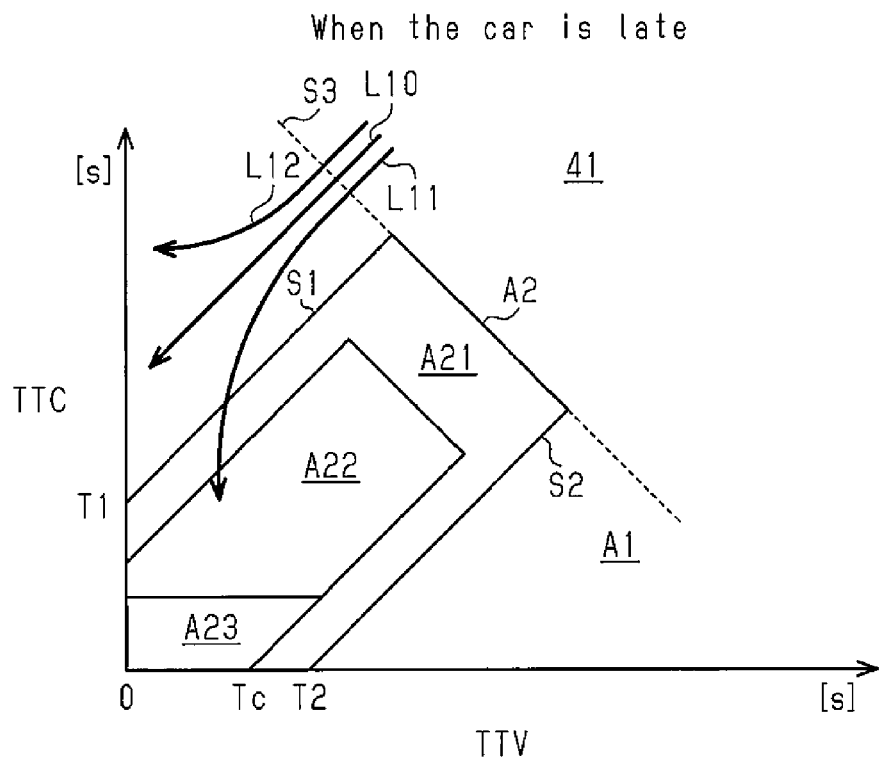
FIG. 4 is a map schematically illustrating a result of adjustments made to the driving assistance shown in FIG. 1.

FIG. 4 shows a case where follow-up cruise assistance is performed when the relationship between the vehicle 10 and moving object 60 is such that the first time TTC>the second time TTV and that the intersection between the first time TTC and the second time TTV is located within the driving assistance unnecessary area A1 of the map 41.

As shown in FIG. 4, if the intersection between the first time TTC and the second time TTV shifts along a path L10, the intersection between the first time TTC and the second time TTV moves inside the driving assistance unnecessary area A1 and does not enter the driving assistance area A2. Namely, when the second time TTV is 0, the moving object 60 will move across in front of the vehicle 10 with a sufficient distance from the vehicle 10. Thus the collision avoidance assistance is not activated.

If the vehicle 10 decelerates, the first time TTC increases, so that the intersection between the first time TTC and the second time TTV shifts along a path L12, i.e., it moves inside the driving assistance unnecessary area A1 and does not enter the driving assistance area A2. Namely, when the second time TTV is 0, the moving object 60 will move across in front of the vehicle 10 with a sufficient distance from the vehicle 10. Thus the collision avoidance assistance is not activated.

On the other hand, if the vehicle 10 accelerates, the first time TTC decreases, so that the intersection between the first time TTC and the second time TTV shifts along a path L11, i.e., it may move out of the driving assistance unnecessary area A1 and enter the driving assistance area A2. Namely, if the difference between the first time TTC and the second time TTV reduces to the range of 1 to 3 seconds, the intersection between the first time TTC and the second time TTV enters the driving assistance area A2. If this happens, the collision avoidance assistance is activated, and deceleration assistance is performed for the vehicle 10 as the collision avoidance assistance. The causes of the speed increase of the vehicle 10 at this time may be the driver's operation of the acceleration pedal, or the acceleration assistance by the follow-up cruise assistance. Namely, if the follow-up cruise assistance is in operation, the acceleration assistance may be performed if an increase in the inter-vehicle distance between the preceding car and the vehicle is detected.

If the deceleration assistance by the collision avoidance assistance is performed immediately after the acceleration assistance by the follow-up cruise assistance, the driver may feel odd. In this embodiment, therefore, the assistance control section 50 adjusts the degree of driving assistance so as not to give such a sense of discomfort to the driver.

Figure 5:
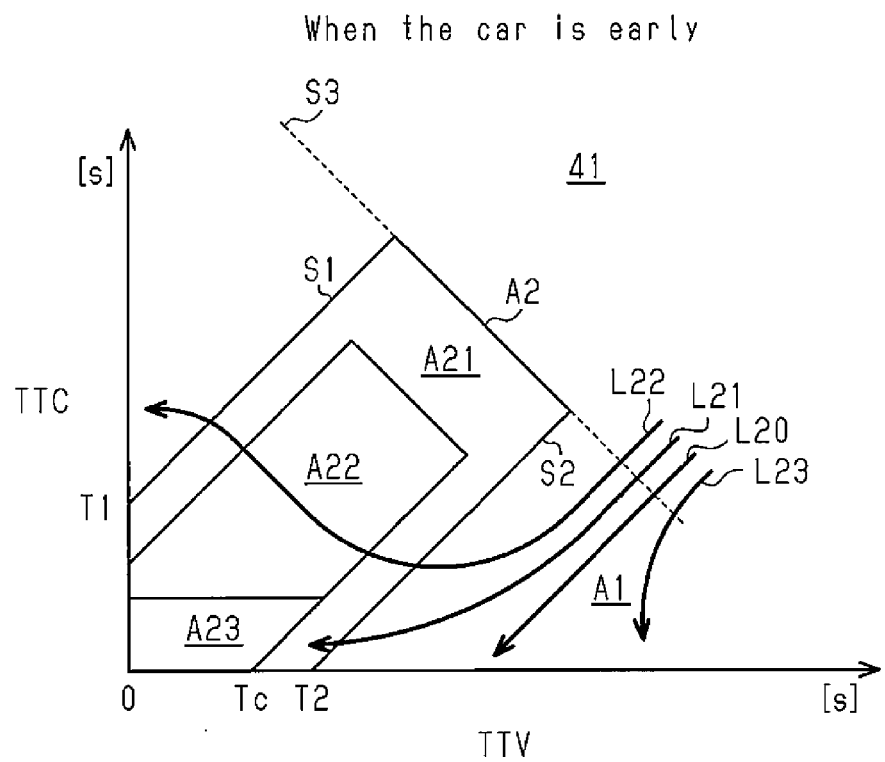
FIG. 5 is a map schematically illustrating a result of adjustments made to the driving assistance shown in FIG. 1.

FIG. 5 shows a case where a follow-up assistance amount H1 is input from the follow-up cruise assisting section 20 when the relationship between the vehicle 10 and moving object 60 is such that the first time TTC<the second time TTV and that the intersection is located within the driving assistance unnecessary area A1.

As shown in FIG. 5, if the intersection between the first time TTC and the second time TTV shifts along a path L20, the intersection between the first time TTC and the second time TTV moves inside the driving assistance unnecessary area A1 and does not enter the driving assistance area A2. Namely, when the first time TTC is 0, the vehicle 10 will move across in front of the moving object 60 with a sufficient distance from the moving object 60. Thus the collision avoidance assistance is not activated.

If the vehicle 10 accelerates, the first time TTC decreases, so that the intersection between the first time TTC and the second time TTV shifts along a path L23, i.e., it moves inside the driving assistance unnecessary area A1 and does not enter the driving assistance area A2. Namely, when the first time TTC is 0, the vehicle 10 will move across in front of the moving object 60 with a sufficient distance from the moving object 60. Thus the collision avoidance assistance is not activated.

On the other hand, if the vehicle 10 slows down, the first time TTC increases, so that the intersection between the first time TTC and the second time TTV moves along a path L21, i.e., it may move out of the driving assistance unnecessary area A1 and enter the driving assistance area A2. Namely, if the difference between the first time TTC and the second time TTV reduces to the range of 1 to 3 seconds, the intersection between the first time TTC and the second time TTV enters the driving assistance area A2. Therefore, the collision avoidance assistance is activated, and deceleration assistance is performed for the vehicle 10 as the collision avoidance assistance. The causes of the speed decrease of the vehicle 10 at this time may be the driver's operation of the acceleration pedal, or the deceleration assistance by the follow-up cruise assistance. Namely, if the follow-up cruise assistance is in operation, the deceleration assistance may be performed if a reduction in the inter-vehicle distance between the preceding car and the vehicle is detected.

If, simply, deceleration assistance by the follow-up cruise assistance is performed here, the intersection between the first time TTC and the second time TTV may approach the origin 0 with the difference between them remaining the same, i.e., it may shift along the path L21. The path L21 may enter from the driving assistance unnecessary area A1 into the driving assistance area A2, to the third area A23 with particularly emergent necessity of avoidance. In that case, the collision avoidance assistance may be performed intensely and may give the driver a strong sense of discomfort.

Therefore, when the deceleration assistance by the follow-up cruise assistance is under way, the amount of deceleration of the vehicle 10 is increased to prolong the first time TTC so that the difference between the first time TTC and the second time TTV is increased in a short time. Thereby, the difference between the first time TTC and the second time TTV changes largely and the intersection between the first time TTC and the second time TTV shifts along the path L22, so that the path L22 will soon move out of the driving assistance area A2 and enter the driving assistance unnecessary area A1. This way, the intensity of the deceleration assistance is only slightly increased temporarily, and intensive intervening collision avoidance assistance is prevented, so that it can be expected that the assistance will not give the driver too high a sense of discomfort.

Namely, if intense collision avoidance assistance is performed because of deceleration assistance by the follow-up cruise assistance, the driving assistance may give the driver a sense of discomfort. In this embodiment, therefore, the assistance control section 50 adjusts the degree of driving assistance so as not to give such a sense of discomfort to the driver.

As shown in FIG. 1, the assistance control section 50 includes a predicting section 51 that predicts, based on the follow-up assistance amount H1, whether the follow-up assistance will activate the collision avoidance assistance. The assistance control section 50 also includes an adjusting section 52 that adjusts the follow-up assistance amount H1 when it is predicted that the collision avoidance assistance will be activated, or adjusts the degree of assistance when a follow-up assistance amount H1 and an avoidance assistance amount H2 are input by changing these two amounts.

The predicting section 51 predicts whether a driving assistance operation executed to the vehicle 10 based on the follow-up assistance amount H1 input from the follow-up cruise assisting section 20 meets an assistance condition for activating the collision avoidance assistance (estimation step). When the value of the first time TTC at the time of the estimation process (at the time of prediction) is larger than the TTC when the intersection between the first time TTC and the second time TTV is on the boundary line S2, the predicting section 51 predicts that the assistance condition for activating the collision avoidance assistance will be met by acceleration assistance. For example, if the intersection between the first time TTC and the second time TTV is located somewhere in the region above the boundary line S2, or on the side of the boundary line S1 in FIG. 3, it is predicted that the assistance condition for activating the collision avoidance assistance will be met by acceleration assistance.

When the value of the first time TTC at the time of prediction is smaller than the TTC when the intersection between the first time TTC and the second time TTV is on the boundary line S1, the predicting section 51 predicts that the assistance condition for activating the collision avoidance assistance will be met by deceleration assistance. For example, if the intersection between the first time TTC and the second time TTV is located somewhere in the region below the boundary line S1, or on the side of the boundary line S2 in FIG. 3, it is predicted that the assistance condition for activating the collision avoidance assistance will be met by deceleration assistance.

When the intersection between the first time TTC and the second time TTV is located somewhere in a region well away from the origin 0, then the predicting section 51 does not need to predict whether the assistance condition for activating the collision avoidance assistance will be met by deceleration assistance or acceleration assistance. For example, if the intersection between the first time TTC and the second time TTV is located somewhere in the region on the side away from the origin 0 of a boundary line S3, which is a line intersecting an intermediate line and passes the driving assistance area A2 that is farthest from the origin 0 in FIG. 3, the predicting section 51 may predict that the assistance condition for activating the collision avoidance assistance will not be met.

The adjusting section 52 adjusts the driving assistance amount appropriately based on the follow-up assistance amount H1, avoidance assistance amount H2, and the estimation results by the predicting section 51, and provides driving assistance based on the adjusted driving assistance amount (adjustment step). The adjusting section 52 outputs a warning instruction signal or an intervening control signal generated based on the adjusted driving assistance amount.

The adjusting section 52 executes the driving assistance operation based on the input follow-up assistance amount H1 when, for example, the predicting section 51 predicts that the assistance condition for activating the collision avoidance assistance will not be met. When the predicting section 51 predicts that the assistance condition for activating the collision avoidance assistance will be met, the adjusting section 52 executes the driving assistance operation based on the follow-up assistance amount H1 that has been adjusted after being input.

Figure 6:
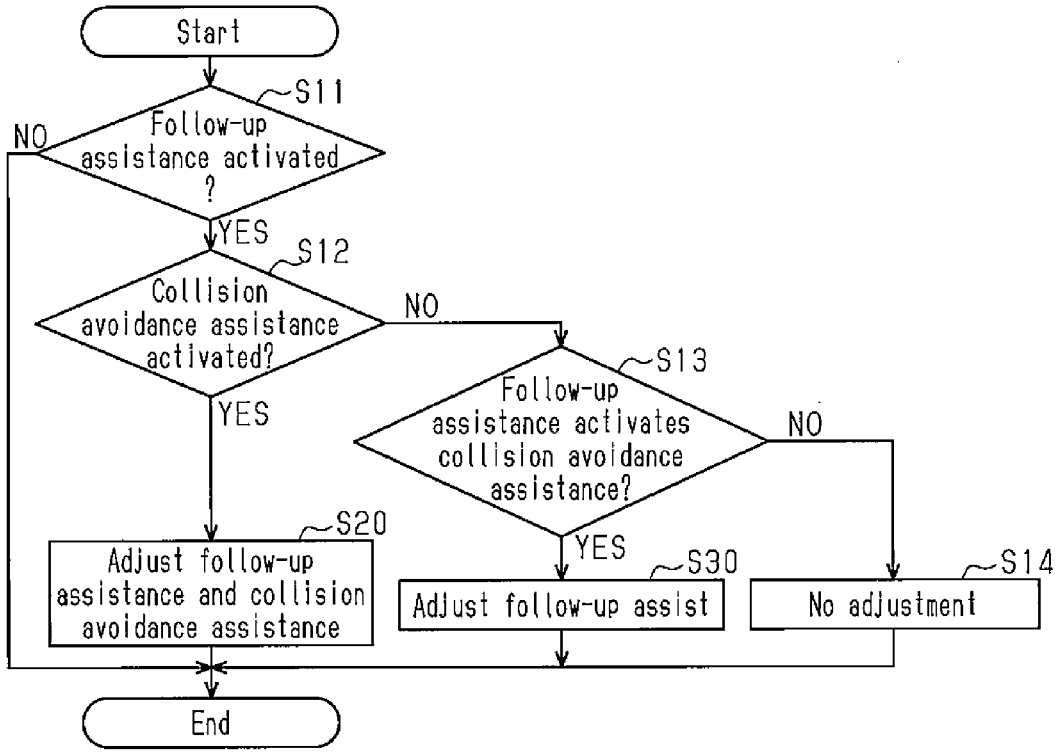
FIG. 6 is a flowchart showing one example of a procedure of adjusting an assistance amount in the driving assistance apparatus shown in FIG. 1.
Figure 7:
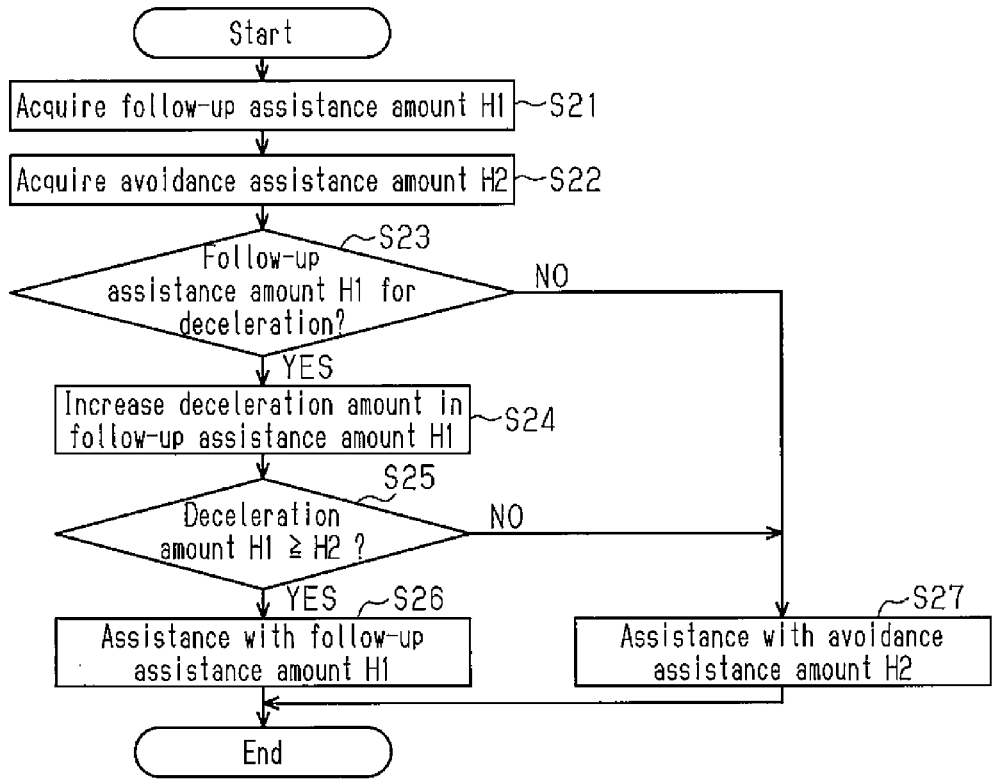
FIG. 7 is a flowchart showing one example of a procedure of adjusting the assistance amount in the driving assistance apparatus shown in FIG. 1.
Figure 8:
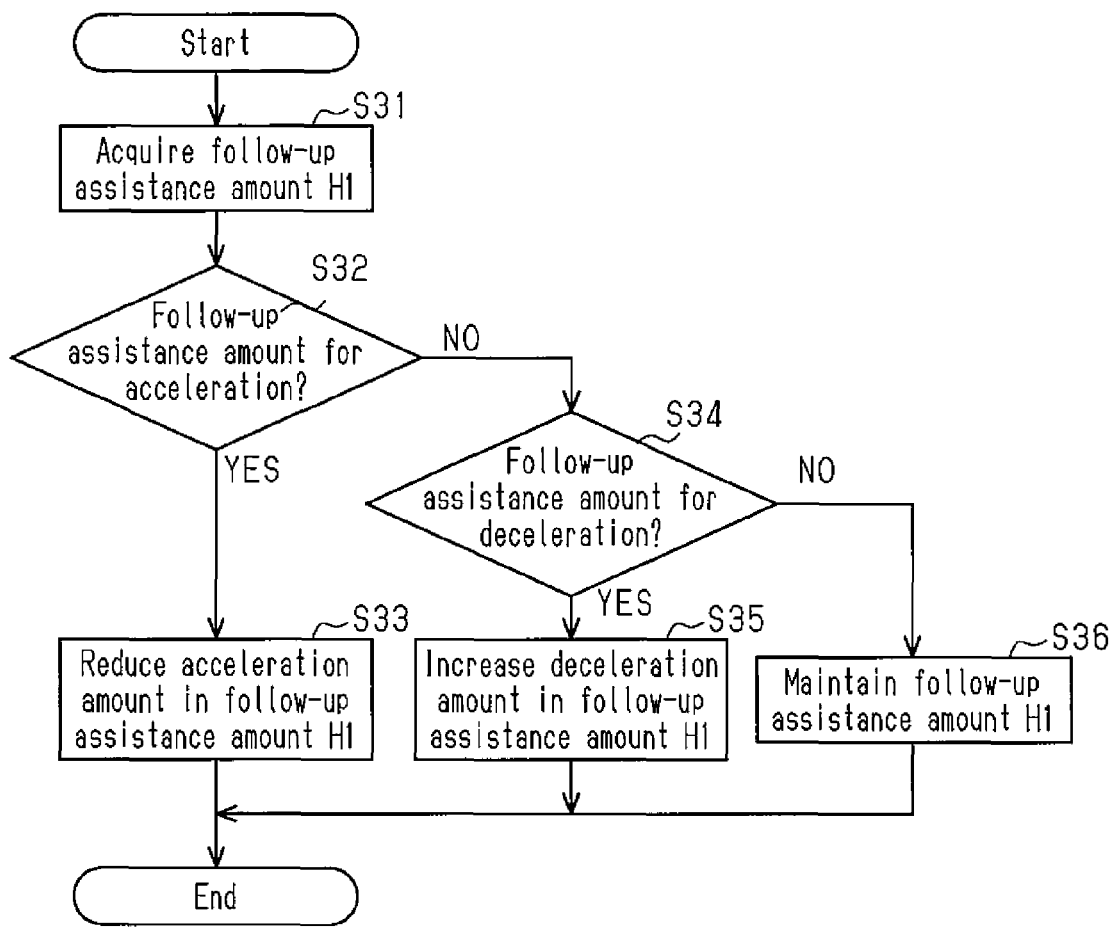
FIG. 8 is a flowchart showing one example of a procedure of adjusting the assistance amount in the driving assistance apparatus shown in FIG. 1.

Next, operation of the assistance control section 50 will be described in detail in accordance with the flowcharts with reference to FIGS. 6 to 8. The process steps shown in FIG. 6 are repeated periodically by the assistance control section 50. The process steps shown in FIGS. 6 to 8 are an example of a procedure for adjusting the assistance amount. It should be understood that the technical concept of this disclosure is not limited to the order of process steps or processing methods shown in the drawings but includes other procedures in which the assistance amount is adjusted based on a result of prediction that an assistance condition for activating the collision avoidance assistance will be met.

As shown in FIG. 6, the assistance control section 50 monitors the follow-up assistance amount H1 and determines whether the follow-up assistance has been activated (step S11 in FIG. 6). Activation of the follow-up assistance can be recognized from the follow-up assistance amount H1 being other than 0, or being first follow-up deceleration amount, second follow-up deceleration amount, first follow-up acceleration amount, or second follow-up acceleration amount. If it is determined that the follow-up assistance has not been activated (NO at step S11 in FIG. 6), the processing by the assistance control section 50 is ended.

If it is determined that the follow-up assistance has been activated (YES at step S11 in FIG. 6), the assistance control section 50 determines whether the collision avoidance assistance has been activated (step S12 in FIG. 6). Activation of the collision avoidance assistance can be recognized from the avoidance assistance amount H2 being other than 0, or being first deceleration amount for avoidance, second deceleration amount for avoidance, or third deceleration amount for avoidance.

If it is determined that the collision avoidance assistance has been activated (YES at step S12 in FIG. 6), the assistance control section 50 adjusts the degree of follow-up assistance and the collision avoidance assistance (step S20 in FIG. 6). After the adjustment, the processing by the assistance control section 50 is ended.

If it is determined that the collision avoidance assistance has not been activated (NO at step S12 in FIG. 6), the assistance control section 50 estimates whether the follow-up assistance meets an assistance condition for activating the collision avoidance assistance (step S13 in FIG. 6). The predicting section 51 predicts whether the follow-up assistance meets an assistance condition for activating the collision avoidance assistance. The predicting section 51 estimates whether the follow-up assistance meets an assistance condition for activating the collision avoidance assistance based on whether the follow-up assistance is acceleration assistance or deceleration assistance.

If it is estimated that the assistance condition for activating the collision avoidance assistance is met (YES at step S13 in FIG. 6), the assistance control section 50 adjusts the assistance amount of follow-up assistance (step S30 in FIG. 6). After the adjustment, the processing by the assistance control section 50 is ended.

On the other hand, if it is estimated that the collision avoidance assistance will not be activated (NO at step S13 in FIG. 6), the assistance control section 50 decides that no adjustment is necessary, and provides driving assistance based on the input follow-up assistance amount H1 (step S14 in FIG. 6), whereupon the processing is ended. Namely, the assistance control section 50 generates an intervention control signal based on the first follow-up acceleration amount, or, generates a warning instruction signal and an intervening control signal based on the second follow-up acceleration amount. Alternatively, the assistance control section 50 generates an intervention control based on the first follow-up deceleration amount, or, generates a warning instruction signal and an intervening control signal based on the second follow-up deceleration amount.

FIG. 7 is a flowchart showing the process steps of adjusting the degree of follow-up assistance and collision avoidance assistance (step S20 in FIG. 6) in detail.

As shown in FIG. 7, the assistance control section 50 acquires a follow-up assistance amount H1 (step S21 in FIG. 7) and acquires an avoidance assistance amount H2 (step S22 in FIG. 7). The assistance control section 50 determines whether the follow-up assistance amount H1 is a deceleration amount (step S23 in FIG. 7). The follow-up assistance amount H1 can be determined as a deceleration amount based on the follow-up assistance amount H1 being the first follow-up deceleration amount, the second follow-up deceleration amount, or a negative value.

If the follow-up assistance amount H1 is determined as a deceleration amount (YES at step S23 in FIG. 7), the assistance control section 50 increases the deceleration amount of the follow-up assistance amount H1 (step S24 in FIG. 7). The increased deceleration amount may be the first deceleration amount for avoidance, the second deceleration amount for avoidance, or any other predetermined values. The assistance control section 50 then determines whether the deceleration amount of the follow-up assistance amount H1 is larger than the deceleration amount of the avoidance assistance amount H2 (step S25 in FIG. 7). If the deceleration amount of the follow-up assistance amount H1 is determined as larger than the deceleration amount of the avoidance assistance amount H2 (YES at step S25 in FIG. 7), the assistance control section 50 provides driving assistance with the increased deceleration amount of the follow-up assistance amount H1 (step S26 in FIG. 7). This is because, with this deceleration amount, the purposes of both the follow-up assistance and the collision avoidance assistance can be fulfilled. The processing done at step S20 in FIG. 6 is thus ended.

On the other hand, if the follow-up assistance amount H1 is not determined as a deceleration amount (NO at step S23 in FIG. 7), the assistance control section 50 provides driving assistance with the amount of deceleration of the avoidance assistance amount H2 (step S27 in FIG. 7). This is because, if deceleration assistance is included in a plurality of types of driving assistance, it is preferable to put priority on the deceleration assistance.

If the deceleration amount of the follow-up assistance amount H1 is not determined as larger than the deceleration amount of the avoidance assistance amount H2 (NO at step S25 in FIG. 7), the assistance control section 50 provides driving assistance with the deceleration amount of the avoidance assistance amount H2 (step S27 in FIG. 7). This is because, if a plurality of deceleration assistance operations is included in a plurality of types of driving assistance, it is preferable to put priority on the deceleration assistance operation with a largest deceleration amount. If a plurality of deceleration assistance operations is included, the largest deceleration amount may even be increased further.

The processing done at step S20 in FIG. 6 is thus ended.

This way, when the follow-up assistance and collision avoidance assistance are activated at the same time on the vehicle 10, and even if a plurality of assistance amounts is output based on the respective types of assistance, such as follow-up assistance amount H1 and avoidance assistance amount H2, the driving assistance operation is executed with a largest deceleration assistance amount, of the follow-up assistance amount H1 and avoidance assistance amount H2. Thereby, driving assistance is provided to the vehicle 10 in a non-contradictory manner, and the possibility of giving the driving a sense of discomfort is reduced.

FIG. 8 is a flowchart showing the process steps of adjusting the assistance amount of the follow-up assistance (step S30 in FIG. 6) in detail.

As shown in FIG. 8, the assistance control section 50 acquires a follow-up assistance amount H1 (step S31 in FIG. 8) and determines whether the follow-up assistance is acceleration assistance (step S32 in FIG. 8). The follow-up assistance can be determined as acceleration assistance based on the follow-up assistance amount H1 being first follow-up acceleration amount, second follow-up acceleration amount, or a positive value. If the follow-up assistance is determined as acceleration assistance (YES at step S32 in FIG. 8), the assistance control section 50 decreases the acceleration amount of the follow-up assistance amount H1 (step S33 in FIG. 8). The acceleration amount of the follow-up assistance amount H1 can be decreased by reducing the acceleration amount to a predetermined rate, or by a predetermined amount, or changing it to 0. The processing done at step S30 in FIG. 6 is thus ended.

At step S13, it is determined whether the follow-up assistance is acceleration assistance or deceleration assistance, and at this step S32, too, it is determined whether the follow-up assistance is acceleration assistance. Since the determination is made based on the same follow-up assistance amount H1 at step S13 and step S32, the results of determination at step S13 and step S32 are the same.

This in turn makes it possible to prevent the acceleration assistance of the follow-up assistance from activating the collision avoidance assistance and triggering deceleration assistance. By preventing deceleration assistance from being performed immediately after acceleration assistance, the possibility that the driving assistance will give the driving a sense of discomfort is reduced.

On the other hand, if the follow-up assistance is not determined as acceleration assistance (NO at step S32 in FIG. 8), the assistance control section 50 determines whether the follow-up assistance is deceleration assistance (step S34 in FIG. 8). The follow-up assistance can be determined as deceleration assistance based on the follow-up assistance amount H1 being the first follow-up deceleration amount, the second follow-up deceleration amount, or a negative value. If the follow-up assistance is determined as deceleration assistance (YES at step S34 in FIG. 8), the assistance control section 50 increases the deceleration amount of the follow-up assistance amount H1 (step S35 in FIG. 8). The deceleration amount of the follow-up assistance amount H1 can be augmented by increasing it with the first deceleration amount for avoidance or the second deceleration amount for avoidance as an increment, increasing it to a predetermined rate, or by a predetermined amount, or changing it to a predetermined value. The processing done at step S30 in FIG. 6 is thus ended.

This way, it is possible to quickly end the collision avoidance assistance activated by deceleration assistance of the follow-up assistance. Since the deceleration assistance is prevented from being switched to an even stronger deceleration assistance, i.e., a constant deceleration assistance is maintained, the possibility that the driving assistance will give the driving a sense of discomfort is reduced.

If the follow-up assistance is not determined as deceleration assistance (NO at step S34 in FIG. 8), the assistance control section 50 maintains the follow-up assistance amount H1, whereupon the processing at S30 in FIG. 6 is ended.

According to the driving assistance apparatus of this embodiment, when follow-up assistance is activated on the vehicle 10, the assistance amount is adjusted such that the follow-up assistance is prevented from activating collision avoidance assistance, or that collision avoidance assistance that has been activated can be ended quickly, and the driving assistance operation is executed based on this adjusted assistance amount. Therefore, the driving assistance is prevented from being switched over in a short time, and the possibility of giving the driving a sense of discomfort is reduced.

The driving assistance apparatus and the driving assistance method according to the present embodiment achieve the following advantages.

(1) It is possible to predict that the assistance condition for activating the collision avoidance assistance will be met based on the relationship between the vehicle 10 provided with an acceleration/deceleration assistance by the follow-up cruise assisting section 20 and the moving object 60. Based on this prediction, if it is anticipated (expected) that assistance by the collision avoidance assisting section 30 of the vehicle 10 will be activated by the assistance by the follow-up cruise assisting section 20, the degree of the acceleration/deceleration assistance by the follow-up cruise assisting section 20 is adjusted. Namely, if a possibility arises of assistance by the collision avoidance assisting section 30 being provided, the degree of assistance by the follow-up cruise assisting section 20 can be adjusted. In other words, adjustments are made to achieve consistency between the types of assistance of the collision avoidance assisting section 30 and of follow-up cruise assisting section 20, including whether the assistance by the follow-up cruise assisting section 20 meets an assistance condition for activating the assistance by the collision avoidance assisting section 30.

This ensures consistency in the driving assistance of the follow-up cruise assisting section 20 and of the collision avoidance assisting section 30, so that the assistance will give the driver a less sense of discomfort.

(2) It is predicted that the collision avoidance assistance condition will be met by the relationship between the vehicle 10 and a moving object 60 based on the amount of assistance provided by the follow-up cruise assisting section 20 at the time of prediction.

This way, whether the driving assistance by the follow-up cruise assisting section 20 meets the collision avoidance assistance condition can be predicted quickly and easily.

(3) Activation of the collision avoidance assistance by the acceleration assistance is restricted. If the collision avoidance assistance is activated, the assistance content will be switched over from the acceleration assistance, so that there is a possibility that the driver may feel a sense of discomfort.

However, according to this embodiment, if it is predicted that the collision avoidance assistance will be activated, the degree of acceleration assistance is reduced. Namely, frequent changes in the assistance contents caused by the acceleration assistance and collision avoidance assistance being activated are prevented, and the possibility that the driver may feel a sense of discomfort is reduced.

(4) Even if the collision avoidance assistance is activated by deceleration assistance in order to increase the assistance amount of deceleration assistance by the follow-up cruise assisting section 20, the situation where the assistance condition for the collision avoidance assistance is met can more probably be evaded quickly after such activation of the collision avoidance assistance.

Therefore, even if the collision avoidance assistance is activated as a result of assistance by the follow-up cruise assisting section 20, such collision avoidance assistance can be quickly canceled. Moreover, since the amount of deceleration assistance increased by the adjusting section 52 reflects the assistance content of the follow-up cruise assisting section 20, the driver's sense of discomfort can be mitigated.

(5) Since priority is given to the collision avoidance assistance even when acceleration assistance is required as part of the follow-up assistance, a collision between the vehicle 10 and the moving object 60 is avoided. By giving priority to the collision avoidance assistance, at least the degree of acceleration is reduced in advance, so that a sudden change from the acceleration assistance to deceleration assistance is prevented, and the driver's sense of discomfort is mitigated.

(6) When deceleration assistance is required in the follow-up assistance, the deceleration assistance is performed with the same amount of deceleration as by the collision avoidance assistance or with a larger amount. Therefore, a collision between the vehicle and the moving object is avoided, and, the amount of deceleration after adjusted by the adjusting section 52 is consistent with the assistance content of the follow-up cruise assisting section 20.

(7) The collision avoidance assisting section 30 provides driving assistance in the form of collision avoidance assistance based on a first time, or TTC, which is a time taken by the vehicle 10 to reach an meeting point where the courses of the vehicle 10 and the moving object 60 cross each other, and a second time, or TTV, which is a time taken by the moving object 60 to reach the meeting point. In this case, the predicting section 51 can predict an entry into the driving assistance area A2 based on the first time TTC and the second time TTV.

(8) Activation of the collision avoidance assistance and prediction of the activation of the collision avoidance assistance are determined based on the map 41, and the relationship between the first time TTC and the second time TTV.

Second Embodiment

A driving assistance apparatus and a driving assistance method according to a second embodiment will now be described with reference to FIG. 9.

This embodiment includes a brake assisting section that is different from the follow-up cruise section in the first embodiment but is otherwise configured the same. Therefore, the features different from the first embodiment will be described below, wherein the same features are given the same reference numerals, for convenience of explanation, and detailed description of them will be omitted.

Figure 9:
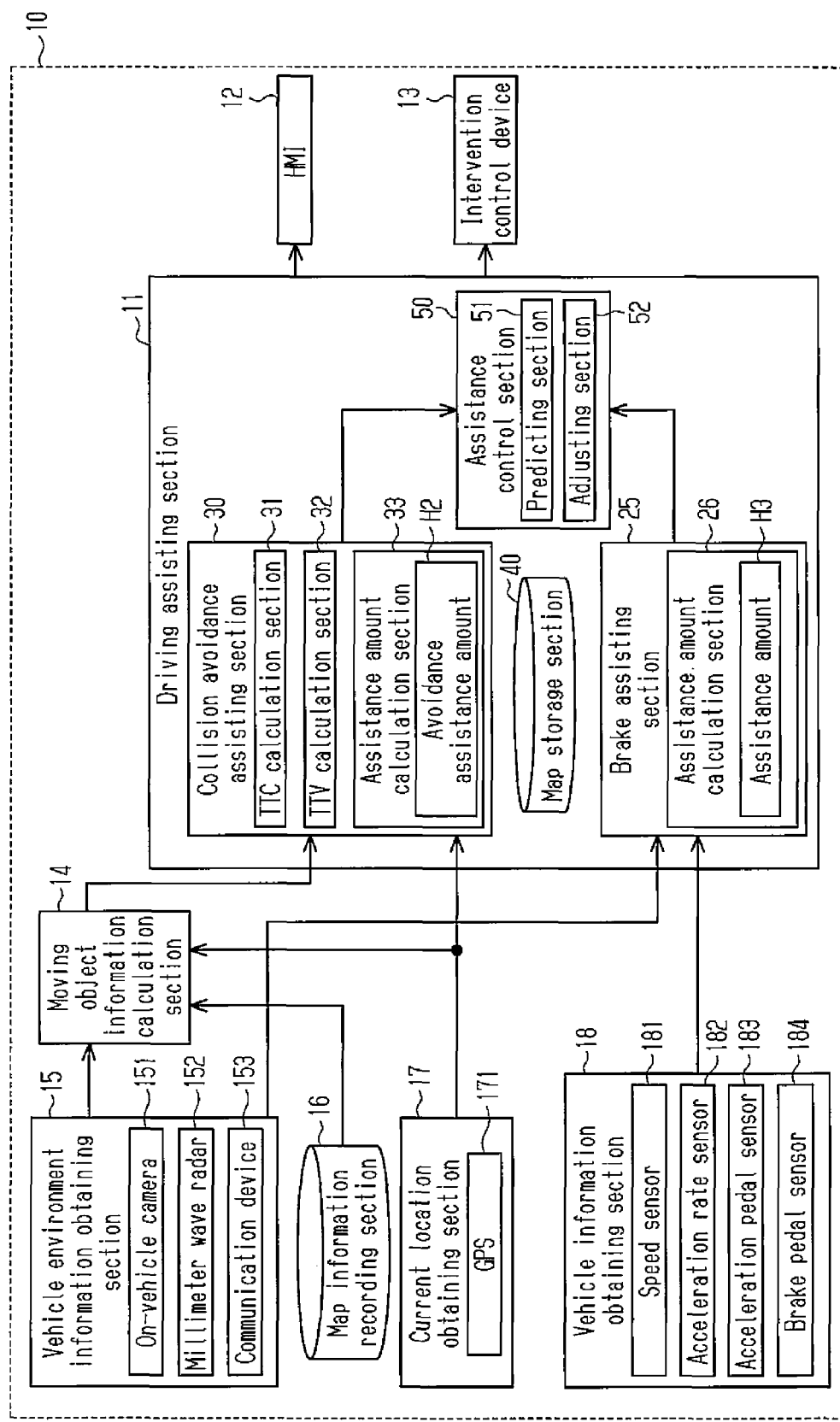
FIG. 9 is a block diagram illustrating the general configuration of a driving assistance apparatus according to a second embodiment of the present invention.

As shown in FIG. 9, the driving assisting section 11 includes a brake assisting section 25 for collision avoidance as a first assisting section. The brake assisting section 25 acquires information on a preceding vehicle from the vehicle environment information obtained by the vehicle environment information obtaining section 15, and acquires vehicle information of the host vehicle 10 from the information obtained by the vehicle information obtaining section 18. The driving assisting section 11 includes an assistance amount calculation section 26 that calculates an amount of assistance H3 corresponding to the inter-vehicle distance between the host vehicle 10 and the preceding car.

The assistance amount calculation section 26 calculates a first deceleration assistance amount based on a decrease in the inter-vehicle distance between the host vehicle 10 and the preceding car to below a predetermined distance, and calculates a second deceleration assistance amount based on a further decrease in the distance. The assistance amount calculation section 26 calculates 0 as the amount of assistance H3 if the inter-vehicle distance is longer than a predetermined distance. The brake assisting section 25 outputs the amount of assistance H3 calculated by the assistance amount calculation section 26 to the assistance control section 50.

This embodiment differs from the first embodiment in that the amount of assistance H3 indicates only the amount of deceleration, unlike the follow-up assistance amount H1. The values of the first deceleration assistance amount and second deceleration assistance amount of this embodiment may differ from the values of the first follow-up deceleration amount or the second follow-up deceleration amount of the first embodiment. However, the control is the same in other respects.

The assistance control section 50 predicts whether the amount of assistance H3 will meet an assistance condition for activating the collision avoidance assistance, and if it is predicted that the assistance condition for activating the collision avoidance assistance will be met, the assistance control section 50 provides driving assistance wherein it increases the amount of assistance H3. Also, when an amount of assistance H3 and an avoidance assistance amount H2 are input, the assistance control section 50 adjusts these amounts of assists in performing the driving assistance.

This way, a large change in the amount of assistance of the driving assistance in a short time is prevented, and the possibility of giving the driving a sense of discomfort is reduced.

As described above, according to the driving assistance apparatus and driving assistance method of this embodiment, the following advantage can be achieved in addition to the advantages (1) to (8) achieved by the previously described first embodiment.

(9) The rear-end collision avoidance assistance by the brake assisting section 25 can be adjusted based on the prediction that the collision avoidance assistance will be activated, so that switchover in the driving assistance contents between a rear-end collision avoidance assistance and collision avoidance assistance is prevented, and possibility of giving the driving a sense of discomfort is reduced.

Other Embodiments

The above described embodiments may be modified as follows.

In the embodiments described above, one example is shown in which the boundary line S3 is shown as a line orthogonal to the intermediate line. This need not necessarily be so and the boundary line may be other than a line orthogonal to the intermediate line, as long as it divides the map to one side with the origin 0 and the other side without the origin 0. For example, the boundary line S3 may be a circular arc at equal distance from the origin 0 or any other lines.

Figure 10:
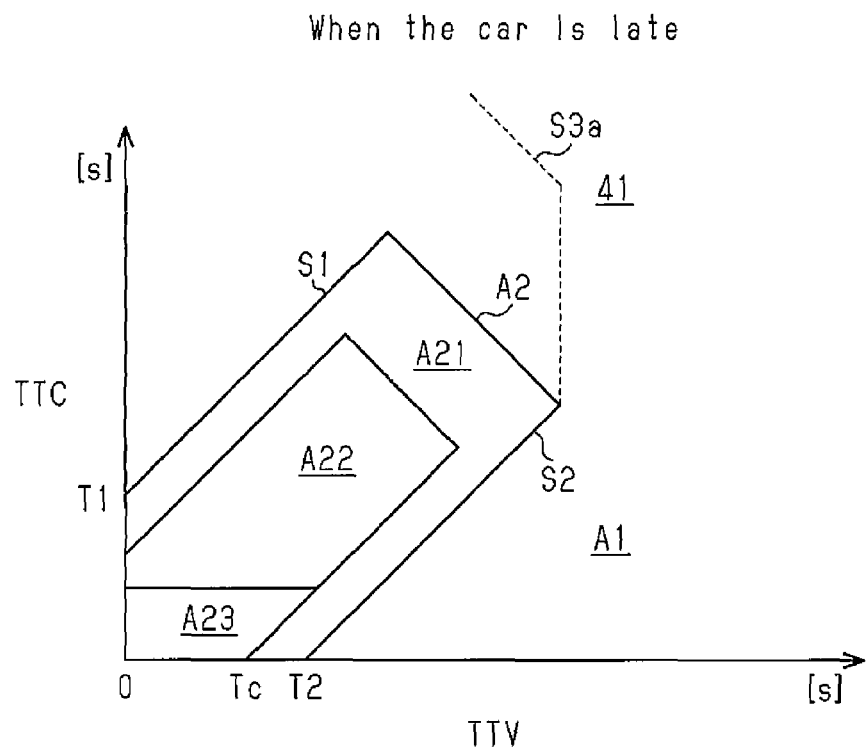
FIG. 10 is a diagram schematically illustrating adjustments to a driving assistance in a driving assistance apparatus according to another embodiment of the present invention.

As shown in FIG. 10, for example, a boundary line S3a for defining an area in which acceleration is to be restricted may be provided such as to define a range where the intersection may enter the driving assistance area A2 if the first time TTC decreases. The boundary line S3a extends upwards from the intersection of the boundary line S2 and the boundary line S3, i.e., in a direction in which the first time TTC increases.

Figure 11:
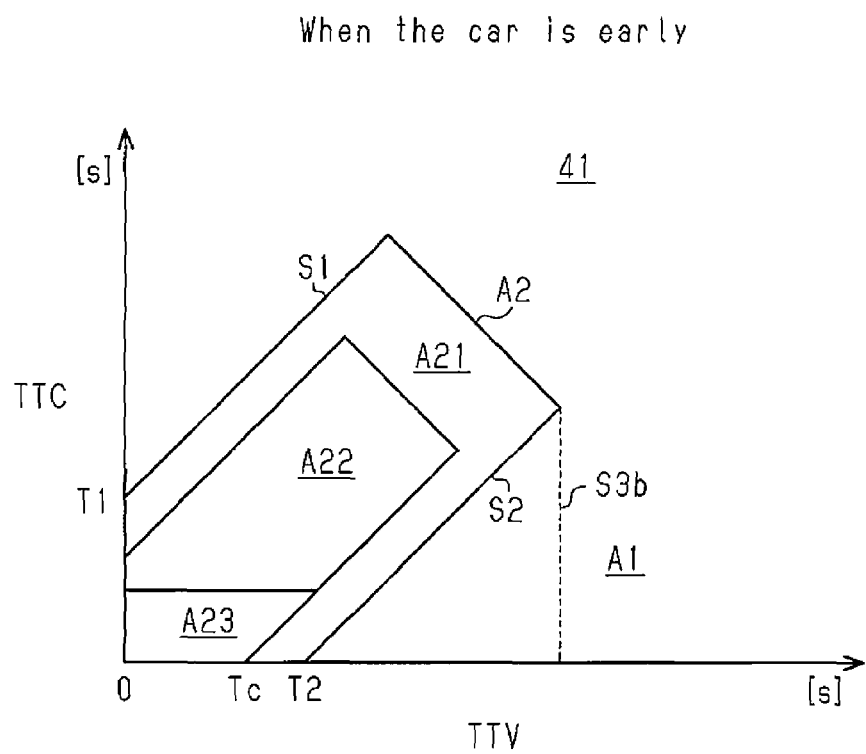
FIG. 11 is a diagram schematically illustrating adjustments to a driving assistance in a driving assistance apparatus according to another embodiment of the present invention.

As shown in FIG. 11, for example, a boundary line S3b for defining an area in which deceleration is to be increased may be provided such as to define a range where the intersection may enter the driving assistance area A2 if the first time TTC increases. The boundary line S3b extends downwards from the intersection of the boundary line S2 and the boundary line S3, i.e., in a direction in which the first time TTC decreases.

In the embodiments described above, one example is shown in which it is determined that the collision avoidance assistance will be activated by the follow-up assistance on condition that the intersection between the first time TTC and the second time TTV is located somewhere in the region on one side of the boundary line S3 with the origin 0. This need not necessarily be so and it may be determined based on whether a predicted path of the intersection between the first time TTC and the second time TTV will enter the driving assistance area A2.

If described with the use of the reference numerals of the first embodiment, for example, the predicting section 51 calculates a path of the vehicle 10 until a predetermined time later, e.g., one to ten seconds later, which the vehicle 10 is predicted to follow if the driving assistance is provided with the follow-up assistance amount H1. In predicting the path, it is predicted that the follow-up assistance amount H1 at the time of estimation will be maintained, i.e., will not be changed, until later. Alternatively, the path may be predicted in consideration of a predicted change in the follow-up assistance amount H1, such a change being predicted based on map information or past history. The predicting section 51 calculates a path of the moving object 60 until a predetermined time later, e.g., one to ten seconds later, which the moving object 60 is predicted to follow. In predicting the path, it is predicted that the moving information of the moving object 60 at the time of estimation will be maintained, i.e., will not be changed, until later.

The predicting section 51 then calculates a first time TTC based on the moving path of the vehicle 10 predicted until one to ten seconds later, and a second time TTV based on the moving path of the moving object 60 predicted until one to ten seconds later. The first time TTC can be calculated by a similar calculation by the TTC calculation section 31 of the collision avoidance assisting section 30, and the second time TTV can be calculated by a similar calculation by the TTV calculation section 32 of the collision avoidance assisting section 30. For example, the first time TTC and the second time TTV may be calculated by the TTC calculation section 31 and TTV calculation section 32. The predicting section 51 then calculates an intersection between the first time TTC and the second time TTV based on the predicted first time TTC and the second time TTV until one to ten seconds later. The section then obtains locations of the calculated intersections until one to ten seconds later on the map 41 in the map storage section 40. The section then determines whether the obtained location is within the driving assistance unnecessary area A1 or within the driving assistance area A2. If the obtained location is within the driving assistance unnecessary area A1, the predicting section 51 predicts that the collision avoidance assistance will not be activated, while, if the obtained location is somewhere in the driving assistance area A2, the predicting section 51 predicts that the assistance condition for activating the collision avoidance assistance is met.

Thereby, the flexibility in design of the driving assistance apparatus can be increased, since the accuracy of estimation of whether the assistance condition for activating the collision avoidance assistance is met can be improved.

In the embodiments described above, one example is shown in which the vehicle environment information obtaining section 15 is configured with the on-vehicle camera 151, the millimeter wave radar 152, and the communication device 153. This need not necessarily be so and the vehicle environment information obtaining section may be configured with at least one of an on-vehicle camera, a millimeter wave radar, and a communication device. The vehicle environment information obtaining section may be configured otherwise as long as it is capable of acquiring information indicating the surrounding situation of the vehicle 10, and may be, for example, various sensors. For example, the vehicle environment information obtaining section may also be a mobile information processing device capable of acquiring various pieces of traffic information and the like via the Internet or the like. With this, the driving assisting section can determine the necessity of collision avoidance assistance based on various pieces of traffic information or the like acquired by the mobile information processing device. This way, the driving assisting section can acquire information to be used for determination of the necessity of collision avoidance assistance by more means. Thereby, the flexibility in design of the driving assistance apparatus can be increased.

In the embodiments described above, one example is shown in which the GPS 171 mounted on the vehicle 10 configures the current location obtaining section 17. This need not necessarily be so and a GPS mounted on a mobile information processing device, for example, may configure the current location obtaining section. In this case, the altitude and latitude information obtained by the GPS mounted on the mobile information processing device is acquired by the driving assisting section via wireless communication or the like. Alternatively, the current location obtaining section may be any device that can locate the vehicle. Thereby, the flexibility in design of the driving assistance apparatus can be increased.

In the embodiments described above, one example is shown in which the vehicle information obtaining section 18 is configured with the speed sensor 181, acceleration rate sensor 182, acceleration pedal sensor 183, and brake pedal sensor 184. This need not necessarily be so and vehicle information obtaining section may be configured with at least one of a speed sensor, an acceleration rate sensor, an acceleration pedal sensor, and a brake pedal sensor. Alternatively, the vehicle information obtaining section may be any device that can detect driver's operation of the vehicle such as a sensor that detects the amount of operation of the steering wheel, for example. Thereby, the flexibility in design of the driver assistance apparatus can be increased.

In the embodiments described above, one example is shown in which a warning is also issued by the HMI when intervening control is performed. This need not necessarily be so and only the intervening control may be performed. Thereby, the flexibility in design of the driving assistance apparatus can be increased.

In the embodiments described above, one example is shown in which the driving assistance area A2 of the map 41 is divided into three areas, first area A21, second area A22, and third area A23, each area being associated with an aspect of driving assistance. This need not necessarily be so and the driving assistance area A2 may be divided into four or more areas and each area may be associated with an aspect of driving assistance. The driving assistance area A2 may also be defined by two areas or one area, and the defined area may be associated with an aspect of driving assistance. Thereby, the flexibility in design of the driving assistance apparatus can be increased.

In the embodiments described above, one example is shown in which the collision avoidance assistance is performed based on the map 41 stored in the map storage section 40. This need not necessarily be so and the collision avoidance assistance may be performed without using the map but based on a relationship between the first time and the second time. For example, it may be predicted that the condition for activating the collision avoidance assistance will be met based on whether the values of the first time and the second time are based on a predetermined function, or whether they match the values prescribed as the condition for activating the collision avoidance assistance. Thereby, the flexibility in design of the driving assistance apparatus can be increased.

In the embodiments described above, one example is shown in which the collision avoidance assistance is performed based on a relationship between the first time TTC and the second time TTV. This need not necessarily be so and the collision avoidance assistance may be performed based only on the first time. For example, when there is an object such as a person ahead in the forward direction of the vehicle, the collision avoidance assistance may be performed based on the first time taken by the vehicle to reach this object. Thereby, the range of applications of the driving assistance apparatus can be increased.

In the embodiments described above, one example is shown in which the driving assistance that is predicted to meet an assistance condition for activating the collision avoidance assistance is either follow-up assistance or brake assistance. This need not necessarily be so and the driving assistance that is predicted to meet an assistance condition for activating the collision avoidance assistance may be any type of driving assistance as long as it provides driving assistance to increase or decrease the speed of the vehicle. Such driving assistance may for example be a lane departure warning apparatus (lane keep assist) or the like that provides assistance for the vehicle to maintain the lane. Thereby, the applicability of the driving assistance apparatus can be increased.

In the embodiments described above, one example is shown in which, when the driving assistance that is predicted to meet an assistance condition for activating the collision avoidance assistance is follow-up assistance, the degree of acceleration for the follow-up assistance is reduced, while the degree of deceleration is increased. This need not necessarily be so, and, as long as the vehicle drive safety is ensured, the degree of acceleration for the driving assistance that is predicted to meet an assistance condition for activating the collision avoidance assistance may be increased, and the degree of deceleration assistance may be reduced. Thereby, the range of applications of the driving assistance apparatus can be broadened.

In the embodiments described above, one example is shown in which the driving assisting section 11 includes the follow-up cruise assisting section 20, collision avoidance assisting section 30, and assistance control section 50. This need not necessarily be so, and the processing operations by the follow-up cruise assistance, collision avoidance assisting section, and assistance control section may partly or entirely be performed in different devices, as long as the driving assisting section is able to acquire information.

In contrast, the driving assisting section may include the moving object information calculation section.

Thereby, the flexibility in configuration of the driving assistance apparatus can be increased.

In the embodiments described above, one example is shown in which the driving assistance apparatus is mounted on the vehicle 10. This need not necessarily be so and part of the driving assisting section, or the vehicle environment information obtaining section, either partly or entirely, or the map information recording section, or the current location obtaining section, of the driving assistance apparatus may be provided elsewhere. An external device such as a mobile information processing device may be provided with a function that substitutes part of the driving assisting section, or all or some of the functions of the vehicle environment information obtaining section, or the map information recording section, or the current location obtaining section. The driving assistance apparatus only needs to be able to acquire necessary information from the mobile information processing device.

If the mobile information processing device is a smart phone, for example, various processing steps may be performed by execution of an application program. The smart phone may calculate the moving object information based on the map information held in the phone, or traffic information or the like available via the Internet or the like.

Thereby, the flexibility in configuration of the driving assistance apparatus can be increased.

In the embodiments described above, one example is shown in which the driving assistance apparatus is mounted on the vehicle 10. The driving assistance apparatus need not necessarily be mounted on the vehicle but may be provided to other moving bodies such as a ship or a robot. Thereby, the range of applications of the driving assistance apparatus is broadened.

DESCRIPTION OF THE REFERENCE NUMERALS

10 . . . Vehicle, 11 . . . Driving assisting section, 12 . . . HMI, 13 . . . Intervention control device, 14 . . . Moving object information calculation section, 15 . . . Vehicle environment information obtaining section, 16 . . . Map information recording section, 17 . . . Current location obtaining section, 18 . . . Vehicle information obtaining section, 20 . . . Follow-up cruise assisting section, 21 . . . Assistance amount calculation section, 25 . . . Brake assisting section, 26 . . . Assistance amount calculation section, 30 . . . Collision avoidance assisting section, 31 . . . TTC calculation section, 32 . . . TTV calculation section, 33 . . . Assistance amount calculation section, 40 . . . Map storage section, 41 . . . Map, 50 . . . Assistance control section, 51 . . . Predicting section, 52 . . . Adjusting section, 60 . . . Moving object, 151 . . . On-vehicle camera, 152 . . . Millimeter wave radar, 153 . . . Communication device, 171 . . . GPS, 181 . . . Speed sensor, 182 . . . Acceleration rate sensor, 183 . . . Acceleration pedal sensor, 184 . . . Brake pedal sensor, A1 . . . Driving assistance unnecessary area, A2 . . . Driving assistance area, H1 . . . Follow-up assistance amount, H2 . . . Avoidance assistance amount, H3 . . . Assistance amount, S1, S2, and S3 . . . Boundary line, A21 . . . First area, A22 . . . Second area, A23 . . . Third area, TTC . . . First time, TTV . . . Second time

The invention claimed is:

1. A driving assistance apparatus that assists in driving a vehicle, comprising:
   a first assisting section that performs acceleration/deceleration assistance for the vehicle;
   a second assisting section, wherein, when it is determined that a relationship between the vehicle and a moving object that has a movement path intersecting with a course of the vehicle meets an assistance condition for activating collision avoidance assistance, the second assisting section performs the collision avoidance assistance for the vehicle to avoid a collision with the moving object;
   a predicting section that predicts that the relationship between the vehicle and the moving object will meet the assistance condition for activating the collision avoidance assistance through execution of the acceleration/deceleration assistance for the vehicle by the first assisting section; and
   an adjusting section that adjusts a degree of the acceleration/deceleration assistance by the first assisting section based on the prediction that the relationship between the vehicle and the moving object will meet the assistance condition, wherein the assistance by the first assisting section is acceleration assistance, and the adjusting section makes an adjustment to restrict the acceleration assistance by the first assisting section when the predicting section predicts that the relationship between the vehicle and the moving object will meet the assistance condition for activating the collision avoidance assistance, so that frequent changes in the assistance contents because of the acceleration assistance and collision avoidance assistance being both activated are prevented, and the possibility that the driving may fed a sense of discomfort is reduced, wherein the assistance by the first assisting section is deceleration assistance; and the adjusting section makes an adjustment to increase an amount of the deceleration assistance by the first assisting section when the predicting section predicts that the relationship between the vehicle and the moving object will meet the assistance condition for activating the collision avoidance assistance, so that even if collision avoidance assistance is activated as the result of assistance by the first assisting section, such collision avoidance assistance can be quickly canceled, and since the amount of deceleration assistance increased by the adjusting section reflects the assistance content of the first assisting section, the driver's sense of discomfort is mitigated.

2. The driving assistance apparatus according to claim 1, wherein the predicting section predicts that the relationship between the vehicle and the moving object will meet the assistance condition for activating the collision avoidance assistance based on an amount of assistance provided by the first assisting section at the time of the prediction.

3. The driving assistance apparatus according to claim 1, wherein, when acceleration assistance by the first assisting section and the collision avoidance assistance by the second assisting section are provided simultaneously, the adjusting section makes an adjustment to give priority to the collision avoidance assistance over the acceleration assistance.

4. The driving assistance apparatus according to claim 1, wherein, when deceleration assistance by the first assisting section and the collision avoidance assistance by the second assisting section are provided simultaneously, the adjusting section makes an adjustment simultaneously to change a deceleration amount to a value larger than or equal to the larger one of deceleration amounts of the deceleration assistance and the collision avoidance assistance.

5. The driving assistance apparatus according to claim 1, wherein the second assisting section determines a first time taken by the vehicle to reach an meeting point where the vehicle meets the moving object cross, and a second time taken by the moving object to reach the meeting point, and determines whether the assistance condition for activating the collision avoidance assistance is met based on presence or absence of entry into a determination basis area defined by a relationship between the determined first time and second time, and the predicting section predicts that the assistance condition will be met based on the relationship between the first time and the second time in relation to the determined determination basis area.

6. The driving assistance apparatus according to claim 5, wherein the determination basis area, which is determined based on the relationship between the first time and the second time, is pre-registered as map data.

7. A driving assistance method for assisting in driving a vehicle, comprising:

performing acceleration/deceleration assistance for the vehicle by a first assisting section;

when it is determined that a relationship between the vehicle and a moving object that has a movement path intersecting with a course of the vehicle meets an assistance condition for activating collision avoidance assistance, performing the collision avoidance assistance for the vehicle to avoid a collision with a moving object by a second assisting section;

predicting, by using a prediction section, that the relationship between the vehicle and the moving object will meet the assistance condition for activating the collision avoidance assistance through execution of the acceleration/deceleration assistance for the vehicle; and adjusting, by using an adjusting section, a degree of the acceleration/deceleration assistance based on the prediction that the relationship between the vehicle and the moving object will meet the assistance condition, wherein the assistance by the first assisting section is acceleration assistance, restricting, by the adjusting section, the acceleration assistance by the first assisting section when the predicting section predicts that the relationship between the vehicle and the moving object will meet the assistance condition for activating the collision avoidance assistance, so that frequent changes in the assistance contents because of the acceleration assistance and collision avoidance assistance being both activated are prevented, and the possibility that the driving may feel a sense of discomfort is reduced, wherein the assistance by the first assisting section is deceleration assistance, increasing, by the adjusting section, an amount of the deceleration assistance by the first assisting section when the predicting section predicts that the relationship between the vehicle and the moving object will meet the assistance condition for activating the collision avoidance assistance, so that even if collision avoidance assistance is activated as the result of assistance by the first assisting section, such collision avoidance assistance can be quickly canceled, and since the amount of deceleration assistance increased by the adjusting section reflects the assistance content of the first assisting section the driver's sense of discomfort is mitigated.

* * * * *